United States Patent
Sato et al.

(10) Patent No.: US 8,248,929 B2
(45) Date of Patent: Aug. 21, 2012

(54) MASTER UNIT DEVICE AND BAND MANAGEMENT METHOD USED BY THE SAME MASTER UNIT DEVICE

(75) Inventors: Shuichi Sato, Osaka (JP); Yasuo Hamamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 951 days.

(21) Appl. No.: 12/160,715

(22) PCT Filed: Jan. 5, 2007

(86) PCT No.: PCT/JP2007/050033
§ 371 (c)(1),
(2), (4) Date: Jul. 11, 2008

(87) PCT Pub. No.: WO2007/080833
PCT Pub. Date: Jul. 19, 2007

(65) Prior Publication Data
US 2010/0229037 A1    Sep. 9, 2010

(30) Foreign Application Priority Data
Jan. 13, 2006 (JP) ................................. 2006-005897

(51) Int. Cl.
*H04J 3/16* (2006.01)
*G06F 15/16* (2006.01)

(52) U.S. Cl. ........ 370/230; 370/437; 370/468; 370/507; 709/208; 709/225; 725/80; 375/356

(58) Field of Classification Search .......... 370/229–231, 370/449, 458, 459, 242, 244, 245, 248, 249, 370/252, 503, 507, 509; 725/74, 78, 80–82; 709/208, 217–219, 223–226; 705/50, 51, 705/57; 375/356, 358; 714/55, 700, 704, 714/707, 731, 744, 789
See application file for complete search history.

(56) References Cited

U.S. PATENT DOCUMENTS
6,182,125 B1 * 1/2001 Borella et al. ................ 370/234
(Continued)

FOREIGN PATENT DOCUMENTS
JP    2001-308877    11/2001
(Continued)

OTHER PUBLICATIONS
International Search Report issued Apr. 10, 2007 in the International (PCT) Application of which the present application is the U.S. National Stage.
(Continued)

*Primary Examiner* — Kerri Rose
(74) *Attorney, Agent, or Firm* — Wenderoth, Lind & Ponack, L.L.P.

(57) ABSTRACT

In a network including at least two transmission paths whose bands are respectively managed, an RTT test of DTCP-IP may fail due to a relay wait time generated by the band management regardless of retrials. An objective of the present invention is to assure success of the RTT test. A master unit device manages bands of the transmission paths and includes an RTT test detection section detecting a failure of the RTT test, and a band management section modifying a band management (TXOP allocation) schedule based on an RTT test failure detection. With this configuration, a time band during which no TXOP is allocated is provided between the transmission paths whose bands are respectively managed, thereby assuring success of the RTT test.

16 Claims, 20 Drawing Sheets

U.S. PATENT DOCUMENTS

| | | |
|---|---|---|
| 7,142,512 B1 | 11/2006 | Kobayashi et al. |
| 2004/0193881 A1 | 9/2004 | Ayaki et al. |
| 2005/0287991 A1* | 12/2005 | Shima .......................... 455/411 |

FOREIGN PATENT DOCUMENTS

| | | |
|---|---|---|
| JP | 2002-16599 | 1/2002 |
| JP | 2002-077218 | 3/2002 |
| JP | 2004-295337 | 10/2004 |
| JP | 2005-143118 | 6/2005 |
| JP | 2006-173678 | 6/2006 |
| JP | 2006-270248 | 10/2006 |
| JP | 2007-074285 | 3/2007 |

OTHER PUBLICATIONS

DTCP vol. 1 Supplement E Revision 1.2 (Informational Version) (pp. 24-27, Fig. 4), Jun. 15, 2007.

* cited by examiner

F I G. 6
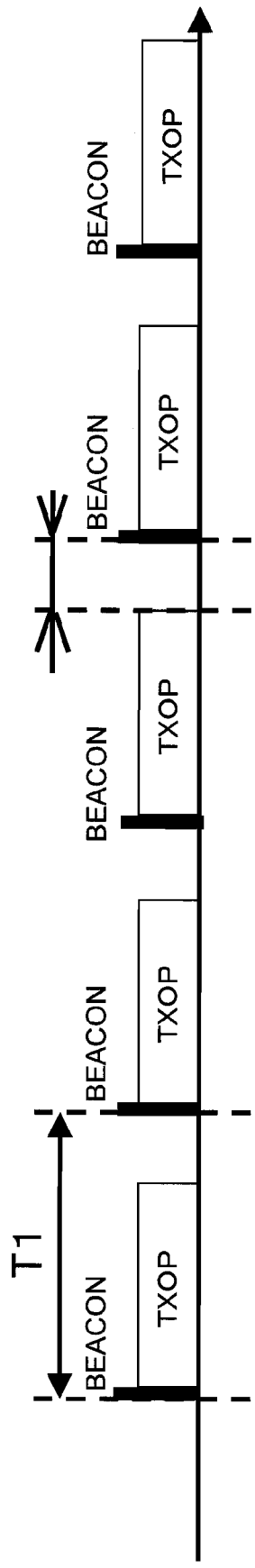
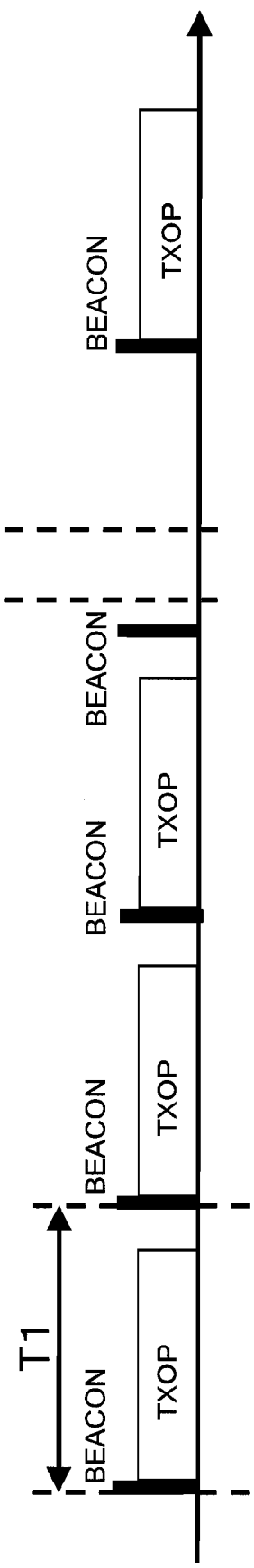

FIG. 13

MANAGEMENT INFORMATION FRAME

| FRAME IDENTIFICATION INFORMATION ※INFORMATION IDENTIFYING MANAGEMENT INFORMATION FRAME | TSF TIMER VALUE (SYNCHRONIZATION SETTING VALUE) | TXOP ALLOCATION PROHIBITED TIME BAND |

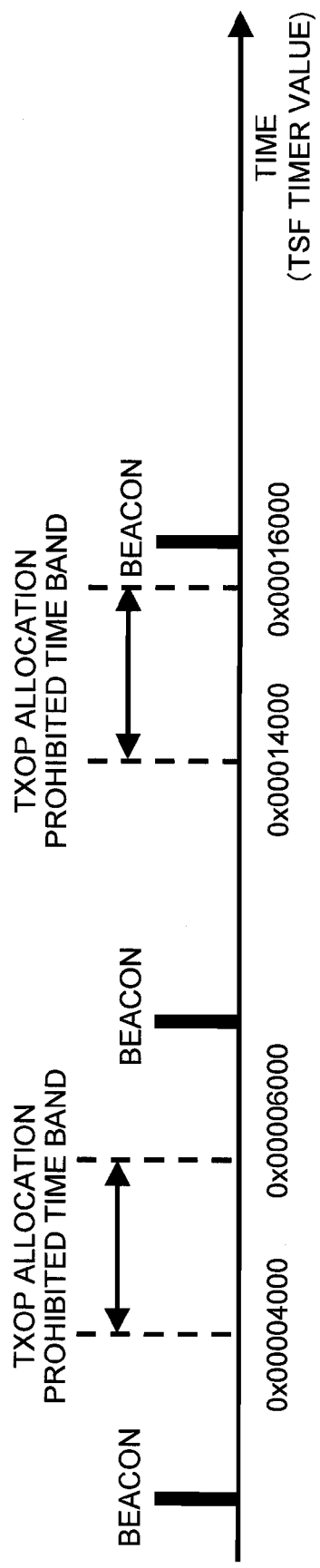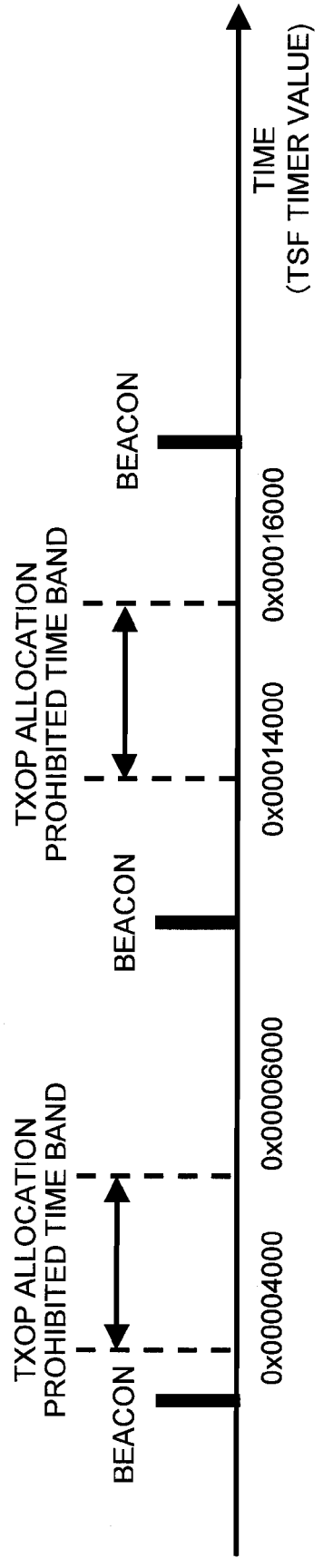
FIG. 14

F I G. 1 7 (Prior Art)

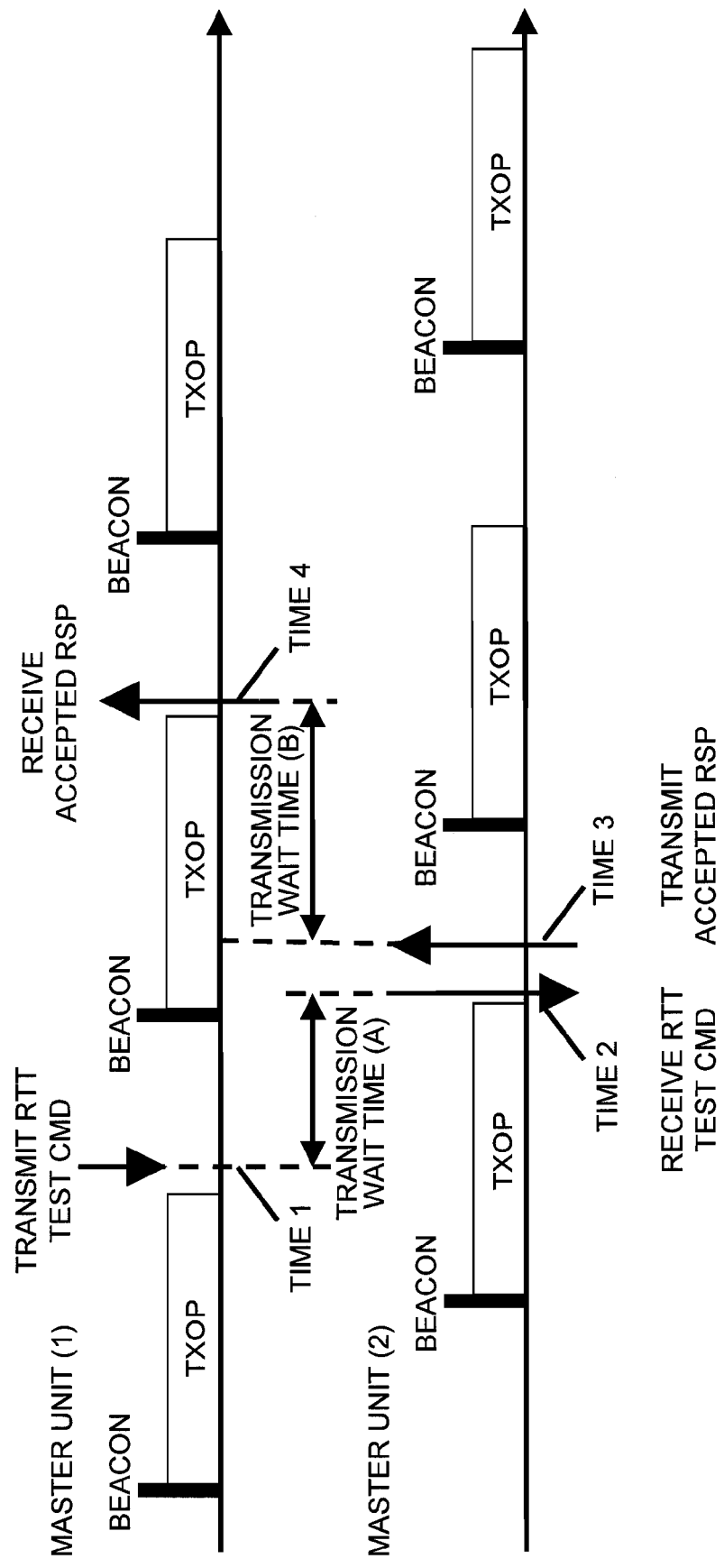

MASTER UNIT DEVICE AND BAND MANAGEMENT METHOD USED BY THE SAME MASTER UNIT DEVICE

TECHNICAL FIELD

The present invention relates to a master unit device and a band management method used by the master unit device, and more particularly to a master unit device which forms a unit network in cooperation with a slave unit and manages a communication time band of the slave unit, and a band management method used by master unit device.

BACKGROUND ART

Conventionally, there is a communication system which provides a high quality to a user by managing a band. For example, in case of a wireless communication system using a standard typified by the IEEE802.11e standard, there is a method in which a master unit device performs a scheduling for allocating a communication time band of a slave unit based on a band amount (time or a data rate, for example) requested by the slave unit, thereby granting a transmission right to the slave unit (patent document 1, for example). FIG. 17 is a diagram illustrating a conventional band management method disclosed in patent document 1.

In patent document 1, a master unit device regularly transmits a beacon, which is a control frame, to a slave unit, and grants a transmission right to the slave unit within a time period divided by the beacon (hereinafter referred to as beacon segment). Thus, the master unit device manages a communication time band of the slave unit. Specifically, the master unit device transmits, to the slave unit, a frame indicating a grant of a transmission right (CF-Poll), thereby granting, to the slave unit, a TXOP (Transmission Opportunity) which is an occupancy period of a transmission path. The slave unit which has acquired the TXOP from the CF-Poll is allowed to perform frame transmission, occupying a transmission path during the occupancy period. As such, each specific slave unit occupies a transmission path at predetermined time intervals, thereby avoiding frame collision with other slave units. Thus, it becomes possible to provide a high communication quality to the user.

On the other hand, along with such improved communication quality, a copyright technique has been developed for preventing a content, such as video or the like, from being distributed in a high-quality network in a random manner. For example, DTCP-IP (Digital Transmission Content Protection over Internet Protocol) is known as an algorithm which realizes copyright protection in a network. DTCP-IP has a mechanism in which an authentication/key exchange is performed between Source (video transmission side) and Sink (video reception side) on a content such as video data which requires the copyright protection, thereby encrypting the video data so as to be transferred (see non-patent document 1 for details). FIG. 18 shows authentication steps in DTCP-IP. When performing the DTCP-IP authentication, an RTT (Round Trip Time) test is implemented for limiting a distribution area. The RTT test is a test measuring a time required from when Source transmits a frame (RTT_TEST(MAC1A). CMD) to Sink to when a response frame (ACCEPTED (MAC2B).RSP) transmitted from Sink arrives at Source, i.e., a time required for a signal to travel between Source and Sink. The RTT test has a time limit equal to or less than 7 msec, and when a required time satisfies the time limit within 1023 times of test trials, that is, within 1022 times of test retrials, the authentication steps are completed, thereby allowing Source to distribute content data to Sink. On the other hand, all results from 1023 times of the test trials indicate a time period beyond the time limit, it is determined that Source and Sink exist in different buildings, and thus the content data is not to be distributed from Source to Sink.

With the improved communication quality provided by managed communication time band and the copyright protection technology using DTCP-IP, a high-quality video transmission is being realized in a network established in a house.

Patent document 1: Japanese Laid-Open Patent Publication No. 2005-143118 (pages 3-4, FIG. 1)

Non-patent document: DTCP Volume 1 Supplement E Revision1.2 (Informational Version) (pages 24-27, FIG. 4)

DISCLOSURE OF THE INVENTION

Problems to be Solved by the Invention

From the present time, it is likely that a network configuration in the house becomes more complicated. For example, there may be a case where a network is established such that a plurality of transmission paths respectively managing communication time bands of slave units are connected, and then DTCP-IP authentication is performed in the network. FIG. 19 shows an exemplary configuration of such a network. In a network shown in FIG. 19, wireless communication systems, each causing a master unit device to manage a communication time band of each slave unit, are connected to each other via a wired line. As shown in FIG. 19, the network comprises master units 1$a$ and 1$b$ and slave units 2$a$ to 2$f$. The slave units 2$a$ to 2$c$ are connected to the master unit(1)1$a$ via a wireless transmission path 3$a$, and the master unit(1)1$a$ manages a band of the wireless transmission path 3$a$. Also, the slave units 2$d$ to 2$f$ are connected to the master unit(2)1$b$ via a wireless transmission path 3$b$, and the master unit(2)1$b$ manages a band of the wireless transmission path 3$b$. Furthermore, the master unit(1)1$a$ and the master unit(2)1$b$ are connected to each other via a wired transmission path 4.

Now, it is assumed that the slave unit(1)2$a$ is Source and the slave unit(4)2$d$ is Sink, and video distribution is performed from Source to Sink with DTCP-IP being implemented.

FIG. 20 is a time chart illustrating a state where the RTT test is implemented from Source of the slave unit(1)2$a$ to Sink of the slave unit(4)2$d$ in a network configuration shown in FIG. 19. At a timing of a time 1, the slave unit(1)2$a$ transmits an RTT_TEST(MAC1A).CMD frame to the slave unit(4)2$d$. The RTT_TEST(MAC1A).CMD frame is transmitted from the master unit(1)1$a$ to the master unit(2)1$b$ via the wired transmission path 4. Then, the master unit device(2)1$b$ relays the RTT_TEST(MAC1A).CMD frame to the slave unit(4)2$d$. However, if a TXOP is allocated to other slave units such as the slave unit(5)2$e$ or the slave unit(6)2$f$ when the RTT_TEST (MAC1A).CMD frame arrives at the master unit device(2)1$b$, the transmission to the slave unit(4)2$d$ is waited until a time at which no TXOP is allocated to any of the slave units (a time 2 shown in FIG. 20). That is, a wait time (A) is generated. Similarly, also at a timing of a time 3 when the slave unit(4)2$d$ transmits an ACCEPTED(MAC2B).RSP, which is a response frame to the RTT_TEST(MAC1A).CMD frame, to the slave unit(1)2$a$, a wait time (B) is generated. Specifically, if the TXOP is allocated to other slave units such as the slave unit(2)2$b$ or the slave unit(3)2$c$ when the ACCEPTED (MAC2B).RSP, as the response frame, arrives at the master unit device(1)1$a$, the transmission to the slave unit(1)2$a$ is waited until a time at which no TXOP is allocated to any of the slave units (a time 4 shown in FIG. 20).

In the case where the bands of the respective wireless transmission paths 3a and 3b are managed in a state where a required time of the RTT test exceeds 7 msec due to these wait times, i.e., the wait time (A) and the wait time (B), even if the RTT test is implemented 1023 times, a required time of every RTT test always exceeds 7 msec, whereby a problem that the DTCP-IP authentication would fail may occur. When the DTCP-IP authentication fails, in spite that Source and Sink actually exist in the same building and there is no problem to transmit data such as video or the like under the Copyright Act, the data cannot be transmitted.

This problem occurs because the master unit(1)1a and the master unit(2)1b have substantially the same beacon interval, and time periods during which no TXOP is allocated are shifted between the master unit devices on a semipermanent basis.

The present invention solves the aforementioned problem. An object of the present invention is to provide a master unit device capable of assuring success of an RTT test by adjusting a band management schedule and reducing a delay time of the RTT test, in a network including at least two unit networks, each of which is formed by a slave unit and the master unit device in cooperation with each other and each of which causes the master unit to manage a communication time band of the slave unit, and also to provide a band management method used by the same master unit device.

Solution to the Problems

The master unit device according to the present invention is a master unit device which forms a unit network in cooperation with a slave unit and manages a communication time band of the slave unit, comprises:

RTT test detection means for detecting, when an RTT (Round Trip Time) test is implemented from a slave unit included in another unit network, an implementation of the RTT test; and band management means for modifying, when the RTT test detection means detects the implementation of the RTT test, a band management schedule of the slave unit managed by the master unit device.

In the present invention, it is preferable that the RTT test detection means detects a re-implementation of the RTT test, and the band management means modifies, when the RTT test detection means detects the re-implementation of the RTT test, the band management schedule of the slave unit managed by the master unit device.

In the present invention, it is preferable that the RTT test is implemented in an authentication procedure of DTCP-IP (Digital Transmission Content Protection over Internet Protocol).

In the present invention, it is preferable that the master unit device is a wireless communication device which complies with an IEEE802.11e standard, and the band management schedule is modified by changing a beacon interval.

In the present invention, it is preferable that the master unit device is a wireless communication device which complies with an IEEE802.11e standard, and the band management schedule is modified by changing an allocation schedule of a TXOP (Transmission Opportunity).

The master unit device according to the present invention is a master unit device which forms a unit network in cooperation with a slave unit and manages a communication time band of the slave unit, comprises:

RTT test detection means for detecting, when an RTT (Round Trip Time) test is implemented from a slave unit included in another unit network, an implementation of the RTT test, and for estimating a subsequent re-implementation time of the RTT test based on a detection result, and band management means for not allocating a communication occupancy right to the slave unit managed by the master unit device in a time period having a constant time length from the re-implementation time of the RTT, which re-implementation time is estimated by the RTT test detection means.

In the present invention, it is preferable that the RTT test is implemented in an authentication procedure of DTCP-IP (Digital Transmission Content Protection over Internet Protocol), and the constant time length is equal to or greater than 7 msec.

In the present invention, it is preferable that the master unit device is a wireless communication device which complies with an IEEE802.11e standard, and the communication occupancy right is allocated by allocating a TXOP (Transmission Opportunity).

The master unit device according to the present invention is a master unit device which forms a unit network in cooperation with a slave unit and manages a communication time band of the slave unit, comprises:

management information setting means for synchronizing a timer used for a band management performed by another master unit device performing the band management of a slave unit included in another unit network with a timer used for a band management performed by the master unit device.

In the present invention, it is preferable that the master unit device is a wireless communication device which complies with an IEEE802.11e standard, and each of the timers is a TSF timer.

The master unit device according to the present invention is a master unit device which forms a unit network in cooperation with a slave unit and manages a communication time band of the slave unit, comprises:

management information setting means for performing a negotiation between the master unit device and another master unit device managing a slave unit included in another unit network so as to synchronize the master unit device with said another master unit device, and for setting a time period during which a communication occupancy right is not allocated to the slave unit, in a same time period as that of said another master unit device, and band management means for not allocating a communication occupancy right in the time period during which the communication occupancy right is not allocated to the slave unit and which time period is set by the management information setting means.

In the present invention, it is preferable that the master unit device is a wireless communication device which complies with an IEEE802.11e standard, and the master unit device and said another master unit device are synchronized with each other by synchronizing TSF timers of the respective master unit devices, and the communication occupancy right is allocated by allocating a TXOP (Transmission Opportunity).

The band management method according to the present invention is a band management method, of managing a communication time band of a slave unit, used by a master unit device which forms a unit network in cooperation with the slave unit, the method comprises:

an RTT test detection step of detecting, when an RTT (Round Trip Time) test is implemented from a slave unit included in another unit network, an implementation of the RTT test; and a band management step of modifying, when the RTT test detection step detects the implementation of the RTT test, a band management schedule of the slave unit managed by the master unit device.

The band management method according to the present invention is a band management method, of managing a communication time band of a slave unit, used by a master unit device which forms a unit network in cooperation with the slave unit, the method comprises:

an RTT test detection step of detecting, when an RTT (Round Trip Time) test is implemented from a slave unit included in another unit network, an implementation of the RTT test, and for estimating a subsequent re-implementation time of the RTT test based on a detection result, and a band management step of not allocating a communication occupancy right to the slave unit managed by the master unit device in a time period having a constant time length from the re-implementation time of the RTT test, which re-implementation time is estimated by the RTT test detection step.

The band management method according to the present invention is a band management method, of managing a communication time band of a slave unit, used by a master unit device which forms a unit network in cooperation with the slave unit, the method comprises:

a management information setting step of synchronizing a timer used for a band management performed by another master unit device performing the band management of a slave unit included in another unit network with a timer used for a band management performed by the master unit device.

The band management method according to the present invention is a band management method, of managing a communication time band of a slave unit, used by a master unit device which forms a unit network in cooperation with the slave unit, the method comprises:

a management information setting step of performing a negotiation between the master unit device and another master unit device managing a slave unit included in another unit network so as to synchronize the master unit device with said another master unit device, and of setting a time period during which a communication occupancy right is not allocated to the slave unit, in a same time period as that of said another master unit device, and a band management step of not allocating a communication occupancy right in the time period during which the communication occupancy right is not allocated to the slave unit and which time period is set by the management information setting step.

Effect of the Invention

According to a master unit device of the present invention and a band management method used by the master unit device, in a network including at least two unit networks, each of which is formed by a slave unit and the master unit device in cooperation with each other and each of which causes the master unit to manage a communication time band of the slave unit, it becomes possible to provide a time band during which no TXOP is allocated in either of the unit networks. Therefore, an RTT test can be implemented in the time band during which no TXOP is allocated, thereby absolutely assuring the success of the RTT test. Thus, even if a complex network is established in one building, content distribution such as video or the like can be assuredly performed from Source to Sink while implementing DTCP-IP in the building.

BRIEF DESCRIPTION OF THE DRAWINGS

FIG. 6 is a time chart illustrating a comparison between statuses of transmission paths whose bands are respectively managed according to the embodiment 1 of the present invention.

FIG. 13 is a diagram illustrating a format of a management information frame according to the embodiment 3 of the present invention.

FIG. 14 is a diagram illustrating a TXOP allocation prohibited time band according to the embodiment 3 of the present invention.

FIG. 20 is a time chart illustrating a status of a transmission path when the RTT test fails in a conventional band management method.

Figure 1:
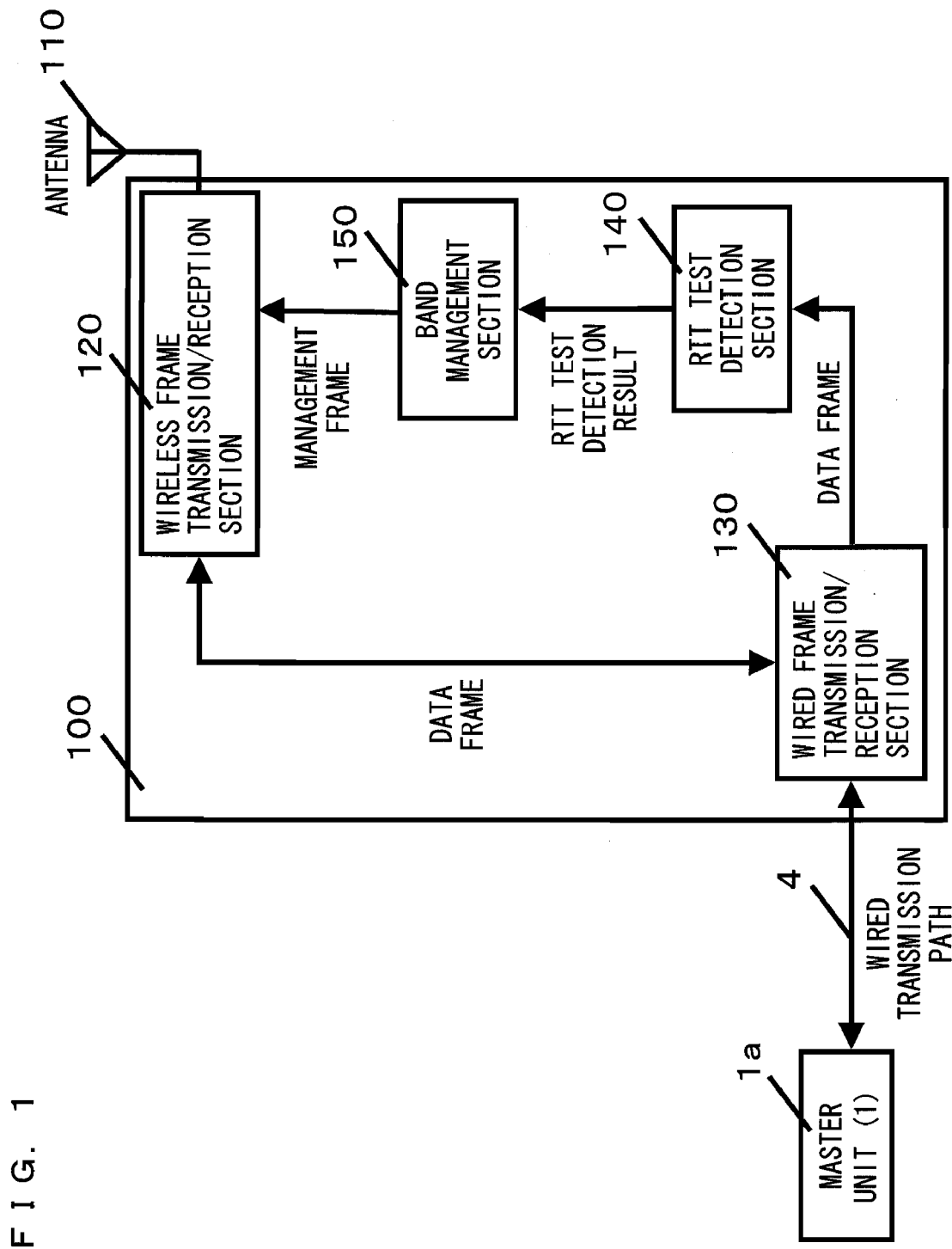
FIG. 1 is a block diagram illustrating a configuration of a master unit device according to an embodiment 1 of the present invention.

DESCRIPTION OF THE REFERENCE CHARACTERS 4 wired transmission path
100, 101, 200a, 200b, 310 master unit device according to the present invention
110 antenna
120 wireless frame transmission/reception section
130 wired frame transmission/reception section
140 RTT test detection section
150 band management section
160 RTT test detection section
161 RTT frame determination section
162 timing estimation section
170 band management section
171 control section
172 CF_Poll issuance section
180 TSF timer
210 management information notification section
220 TSF timer
230 band management section
240 management information setting section

BEST MODE FOR CARRYING OUT THE INVENTION

Hereinafter, embodiments of the present invention will be described with reference to the drawings.

(Embodiment 1)

A master unit device according to an embodiment 1 forms a unit network in cooperation with a slave unit, and is operable to manage a communication time band of the slave unit.

In the embodiment 1, described in detail will be a master unit device which detects an implementation of an RTT test when an RTT test frame is relayed, determines that a wait time is being generated due to its own band management when detecting a failure of the RTT test more than predetermined times, and finally modifies a band management schedule of a transmission path in order to reduce the wait time.

FIG. 1 is a block diagram illustrating a configuration of a master unit device 100 according to the embodiment 1 of the present invention. As shown in FIG. 1, the master unit device 100 comprises an antenna 110, a wireless frame transmission/reception section 120, a wired frame transmission/reception section 130, an RTT test detection section 140 and a band management section 150.

The wireless frame transmission/reception section 120 executes a process of receiving a wireless frame transmitted from a slave unit (not shown) and a process of transmitting a wireless frame to the slave unit. As the process of receiving a wireless frame, the wireless frame transmission/reception section 120 generates a baseband signal by converting a wireless frame received from the antenna 110 into an intermediate frequency in a frequency conversion circuit, decodes the baseband signal as a data frame, and outputs the data frame to the wired frame transmission/reception section 130. As the process of transmitting a wireless frame, the wireless frame transmission/reception section 120 encodes a data frame inputted from the wired frame transmission/reception section 130 so as to generate a baseband signal, increases a frequency of the baseband signal, and emits the baseband signal whose frequency has increased from the antenna 110 as a wireless frame.

The wired frame transmission/reception section 130 executes a process of receiving and transmitting a wired frame. As the process of receiving a wired frame, the wired frame transmission/reception section 130 receives a wired frame from the wired transmission path 4, extracts a data frame from the wired frame, and outputs the data frame to the wireless frame transmission/reception section 120. Furthermore, the wired frame transmission/reception section 130 copies the data frame so as to be outputted to the RTT test detection section 140. As the process of transmitting a wired frame, the wired frame transmission/reception section 130 inputs a data frame from the wireless frame transmission/reception section 120, and transmits the data frame to the wired transmission path 4 as a wired frame.

The RTT test detection section 140, to which the data frame is inputted from the wired frame transmission/reception section 130, determines whether the inputted data frame is a frame relating to an RTT test. Upon detecting a failure of the RTT test based on the determination result, the RTT test detection section 140 notifies the band management section 150 of the failure of the RTT test. A failure of the RTT test can be detected by a re-implementation of the RTT test, for example.

The band management section 150 creates a management frame such as a beacon or a CF-Poll, and transmits the management frame to the slave unit via the wireless frame transmission/reception section 120 and the antenna 110. Furthermore, upon receiving a notification about a failure of the RTT test from the RTT test detection section 140, the band management section 150 modifies a band management schedule of the slave unit. As an example of modifying a band management schedule, a beacon interval or an allocation schedule of a TXOP may be changed.

Figure 2:
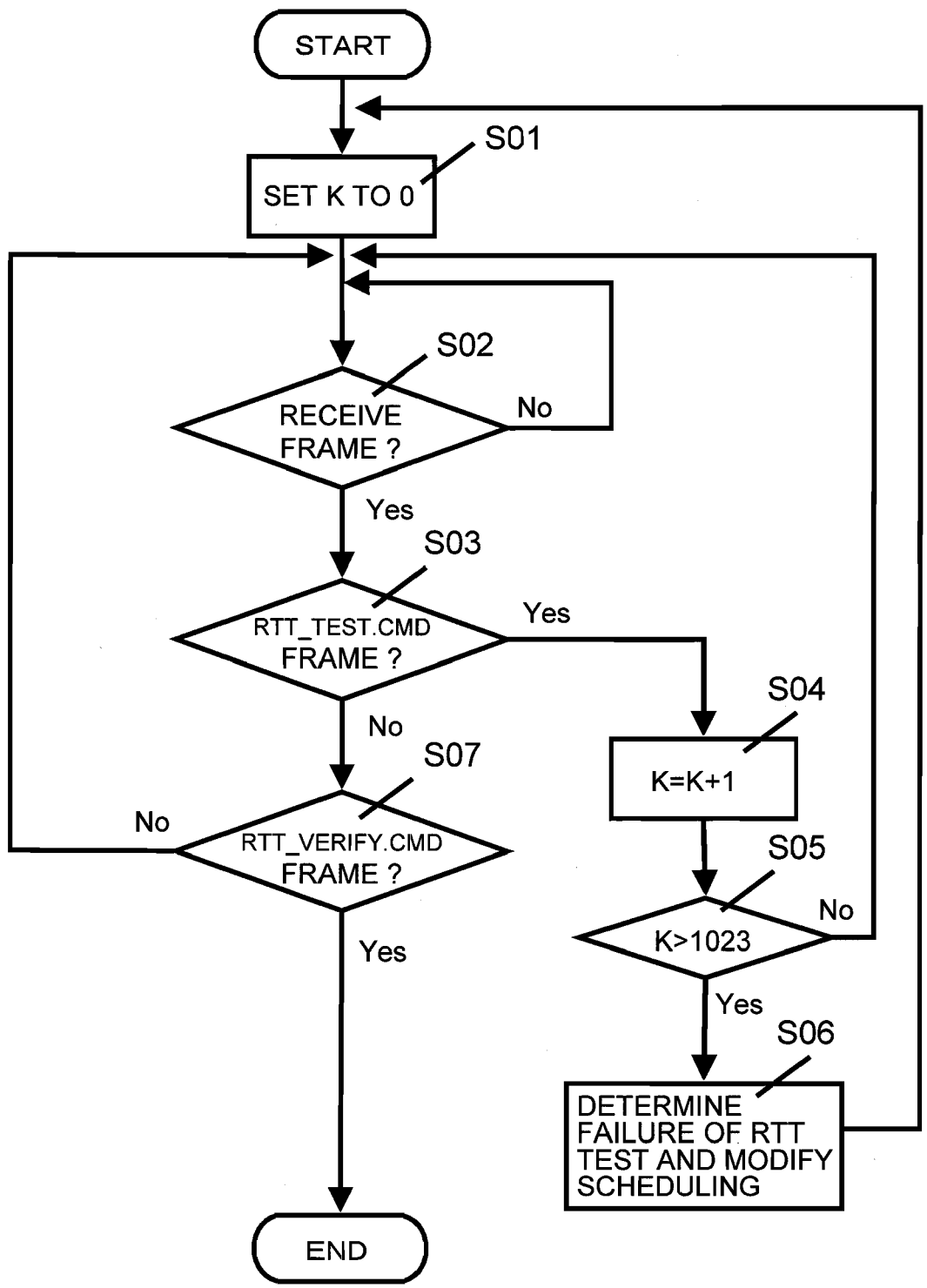
FIG. 2 is a flowchart illustrating a failure detection of an RTT test and a schedule modification process to be executed in accordance with the failure detection of the RTT test according to the embodiment 1 of the present invention.

Operations of the RTT test detection section 140 and the band management section 150 will be further described in detail. FIG. 2 is an example of a flowchart illustrating a failure detection of an RTT test and a band management schedule to be modified in accordance with the failure detection of the RTT test.

Upon startup, the RTT test detection section 140 sets a variable K to 0, the variable K indicating the number of times the RTT test has been implemented (S01). Then, when a data frame is inputted from the wired frame transmission/reception section 130 (S02), the RTT test detection section 140 determines whether or not the data frame is an RTT_TEST (MAC1A).CMD frame (S03). When the data frame is the RTT_TEST(MAC1A).CMD frame (Yes in S03), the RTT test detection section 140 determines that the RTT test has been implemented once, and increments a value of the variable K by 1 (S04). In this case, if the value of the variable K is greater than 1023 (Yes in S05), it is determined that the RTT test has failed, and the RTT test detection section 140 notifies the band management section 150 of a failure of the RTT test. The band management section 150 modifies a schedule relating to a band management in response to the notification mentioned above (S06). When the schedule is modified, the RTT test detection section 140 initializes the variable K to 0 in order to detect the number of times the RTT test is implemented after the schedule is modified (S01), and continues an RTT test detection process.

On the other hand, when the data frame inputted from the wired frame transmission/reception section 130 is an RTT_VERIFY.CMD (Yes in S07), it is determined that the RTT test is completed and the RTT test detection section 140 finishes the process.

As described above, based on the flowchart shown in FIG. 2, a failure of the RTT test is detected and a band management schedule of the slave unit is modified in accordance with the failure detection of the RTT test.

Next, a modification of a band management schedule of the slave unit will be described in detail.

Figure 3:
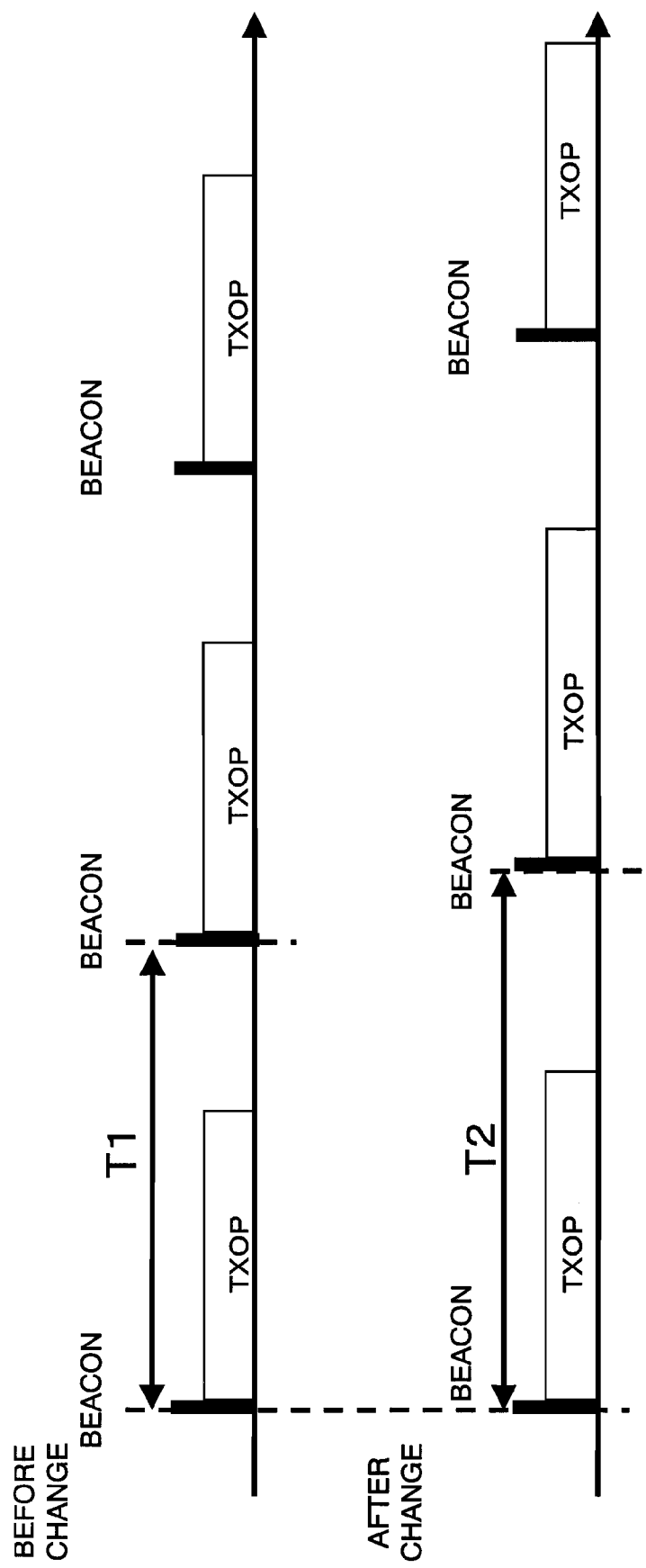
FIG. 3 is a time chart illustrating a band management schedule to be modified in accordance with a change in a beacon interval according to the embodiment 1 of the present invention.

FIG. 3 is a diagram describing a case where a band management schedule is modified by changing a beacon interval. The horizontal axis shown in FIG. 3 represents a time axis. Upon receiving a notification about a failure of the RTT test from the RTT test detection section 140, the band management section 150 changes a beacon interval from a beacon interval T1, which is initially set, to a beacon interval T2. As an example, in case of T1=70 msec, a beacon interval is changed to T2=80 msec or the like, which is different from T1. A time length during which a TXOP is allocated is preferably changed in proportion to a change in the beacon interval. For example, when it is assumed that a total time period during which a TXOP is allocated is 44 msec when an initially set beacon interval is T1=70 msec, the total time period during which a TXOP is allocated will be approximately 50 msec (=44 msec×T2/T1) after the beacon interval is changed (T2=80 msec). As such, a time length during which a TXOP is allocated is changed in accordance with a change in a beacon interval, thereby making it possible to change the beacon interval while maintaining a communication quality (throughput) which is initially assured.

Figure 4:
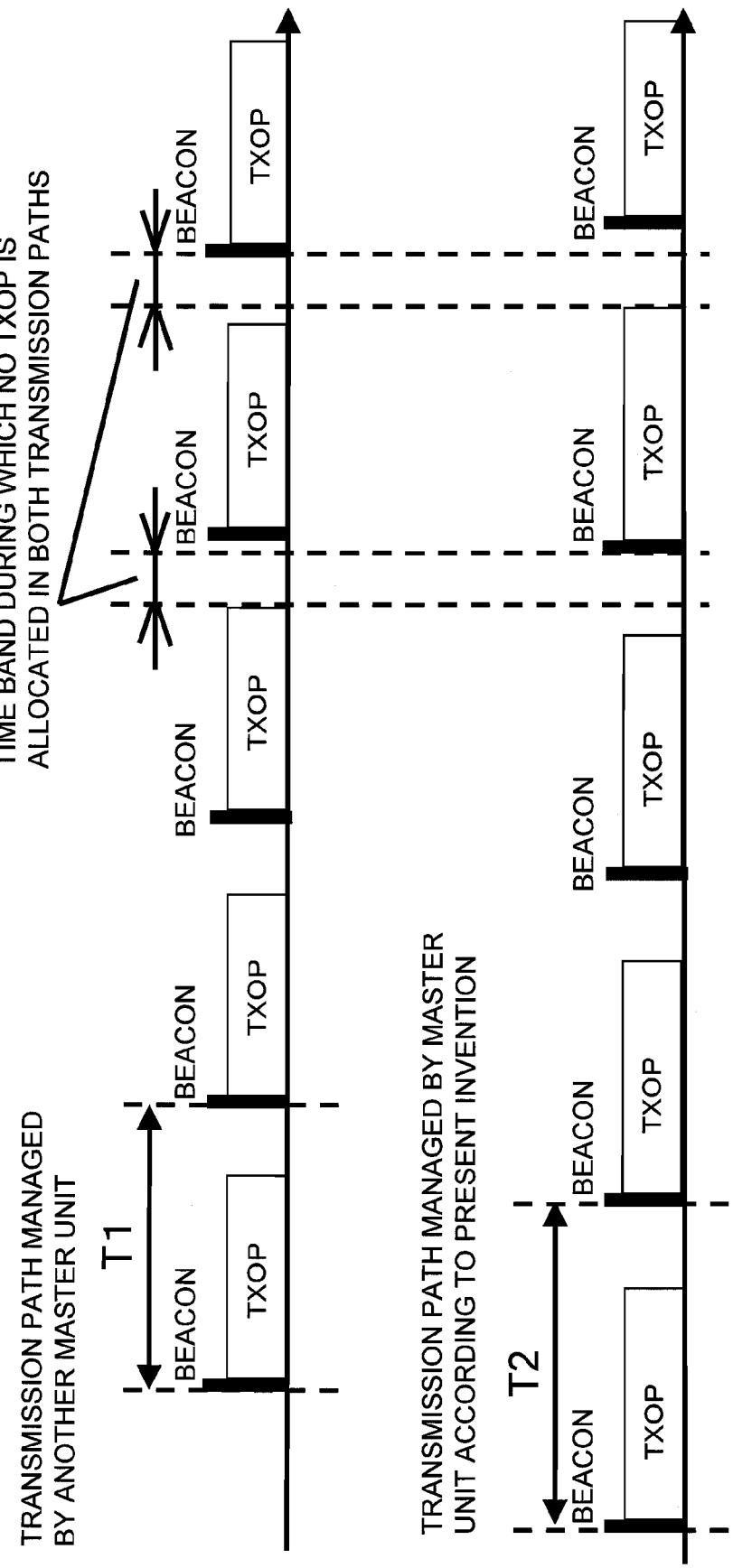
FIG. 4 is a time chart illustrating a comparison between band management statuses of two transmission paths according to the embodiment 1 of the present invention.

A change in the beacon interval accordingly changes an occurrence interval of a time band during which no TXOP is allocated in a transmission path whose band is managed by the master unit device 100. As a result, as shown in FIG. 4, it becomes possible to provide, at the same time, a time band during which no TXOP is allocated between the aforementioned transmission path and a transmission path whose band is managed by another master unit device in accordance with the beacon interval T1 which is an interval before change. In this time band, no wait time is generated during the RTT test, and thus the RTT test can be completed successfully between Source and Sink.

The present embodiment described above illustrates an example where the RTT test detection section 140 determines a failure of the RTT test if the RTT_TEST(MAC1A).CMD frame is detected more than 1023 times. However, this number of times may not be limited to 1023. For example, the number of times may be 512 which is half of 1023. Or the number of times may be even 2. In this case where 2 is set as the number of times, the RTT test can be reimplemented only one time.

Furthermore, the present embodiment described above illustrates an example where the RTT test detection section 140 determines a failure of the RTT test by detecting the RTT_TEST(MAC1A).CMD frame. However, the present embodiment is not limited thereto. For example, the RTT test detection section 140 may determine a failure of the RTT test by detecting an ACCEPTED(MAC2B).RSP frame which is a response frame to the RTT_TEST(MAC1A).CMD frame.

Furthermore, instead of determining a failure of the RTT test based on the number of times the RTT test is implemented, the RTT test detection section 140 may determine a failure of the RTT test based on whether or not a time period from a time of detecting an RTT_TEST(MAC1A).CMD frame to a time of detecting an ACCEPTED(MAC2B).RSP frame is 7 msec or more.

Furthermore, the present embodiment described above illustrates an example where another master unit device (1)1a does not have the same function as that of the master unit device 100 according to the present embodiment. However, if said another master unit device (1)1a has the same function as that of the master unit device 100, a mechanism which enables only a function of either of the master unit devices must be required. This is because if each of the master unit devices detects a failure of the RTT test and then changes the beacon interval from T1 to T2, the master unit devices transmit beacons, respectively, at the same intervals, thereby causing a problem.

As a countermeasure against this problem, there is a method of providing each of the master unit devices with a switch for turning off a change function of a beacon interval, for example. In this case, a change function of the beacon interval is turned off in either of the master unit devices, thereby making it possible to solve the aforementioned problem.

As another countermeasure, the following configuration may be used. Specifically, instead of using the beacon interval T2 shown in FIG. 3 as a fixed value, a value of the beacon interval T2 may be selected from among a plurality of values in a random manner. In this case, the plurality of master unit devices 100 according to the present embodiment can be connected to each other via the wired transmission path 4. This is because if the beacon interval T2 is a random value, the probability of causing the beacon interval T1 which is an interval before change to be equal to the beacon interval T2 which is an interval after change becomes low, thereby making it possible to increase an effect produced by changing the beacon interval. The more options are available to select a value as T2, the closer to 0 the probability of causing T1 to be equal to T2 becomes.

Furthermore, the present embodiment described above illustrates an example where the band management section 150 modifies the schedule by using the beacon interval. However, only a TXOP allocation may be changed without changing the beacon interval. Hereinafter, a method of changing the TXOP allocation will be described.

Figure 5:
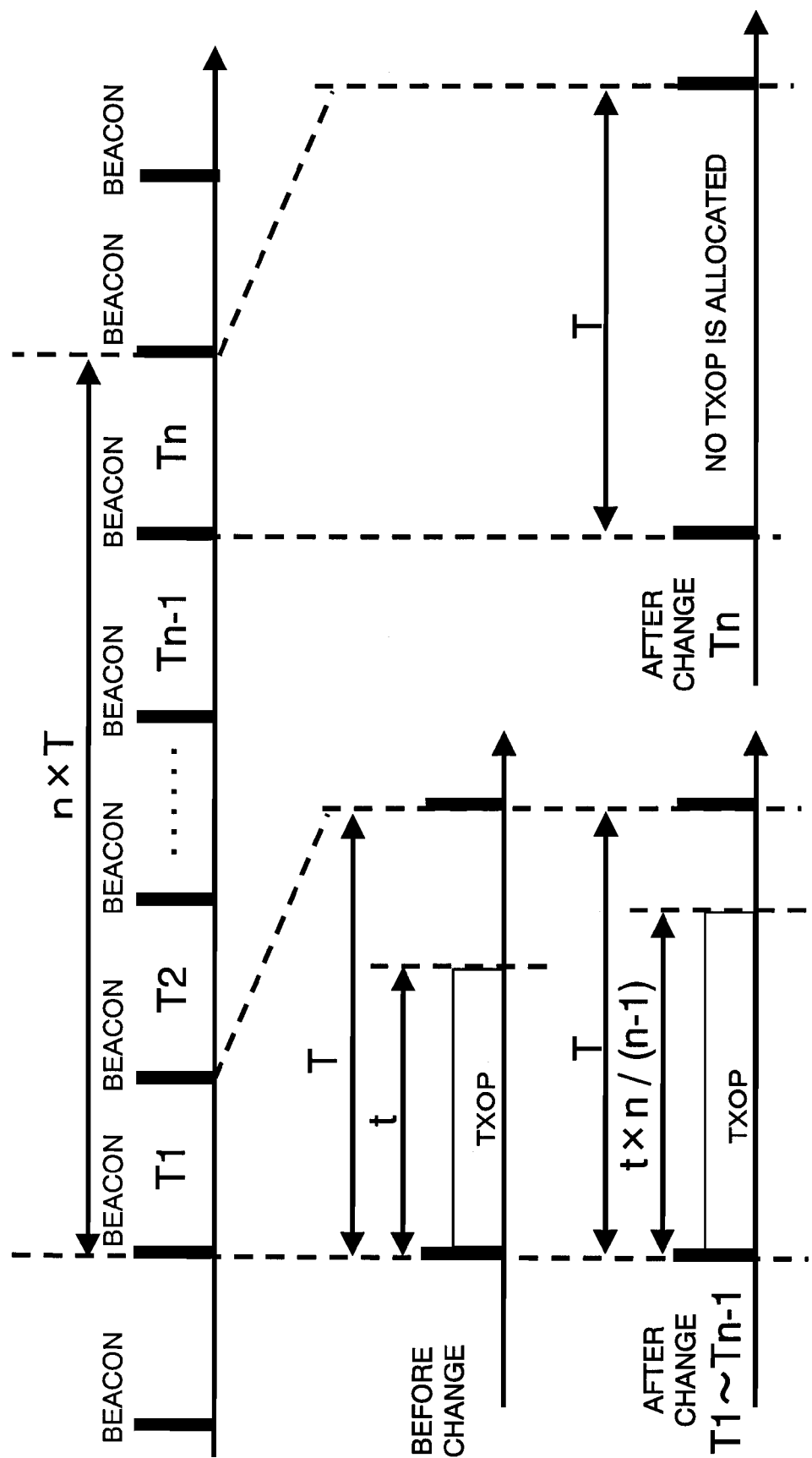
FIG. 5 is a time chart illustrating a method of changing a TXOP allocation by using a plurality of beacon segments according to the embodiment 1 of the present invention.

FIG. 5 illustrates a method of changing a TXOP allocation by using a plurality of beacon segments.

It is assumed that a scheduling is initially performed assuming that a beacon interval is T and a time length, within T, which is occupied by a TXOP is t. This scheduling is modified such that a time segment during which no TXOP is allocated at all, i.e., a TXOP prohibited time band, is provided in one beacon segment among n beacon segments continuous in a temporal direction. When the scheduling is modified in such a manner as described above, a time band corresponding to a TXOP within one beacon segment is distributed among other n−1 beacon segments. FIG. 5 also illustrates a case where the time band corresponding to the TXOP within one beacon segment is equally distributed among other beacon segments after the scheduling is changed. Among the n beacon segments (T1, T2, . . . , Tn−1, Tn), a time length corresponding to t×n/(n−1) of the TXOP is allocated to each of the beacon segments T1 to Tn−1, and no TXOP is allocated in the beacon segment Tn. The schedule of the TXOP is changed in such a manner as described above, thereby making it possible to implement the RTT test without generating any wait time for a time period corresponding to one beacon segment during the RTT test while maintaining a communication quality (throughput) which is initially assured.

As a result, as shown in FIG. 6, a time band during which no TXOP is allocated can be assuredly provided at the same time as that provided in a transmission path whose band is managed by another master unit device. In this time band, no wait time is generated during the RTT test, and thus the RTT test can be completed successfully between Source and Sink.

Figure 7:
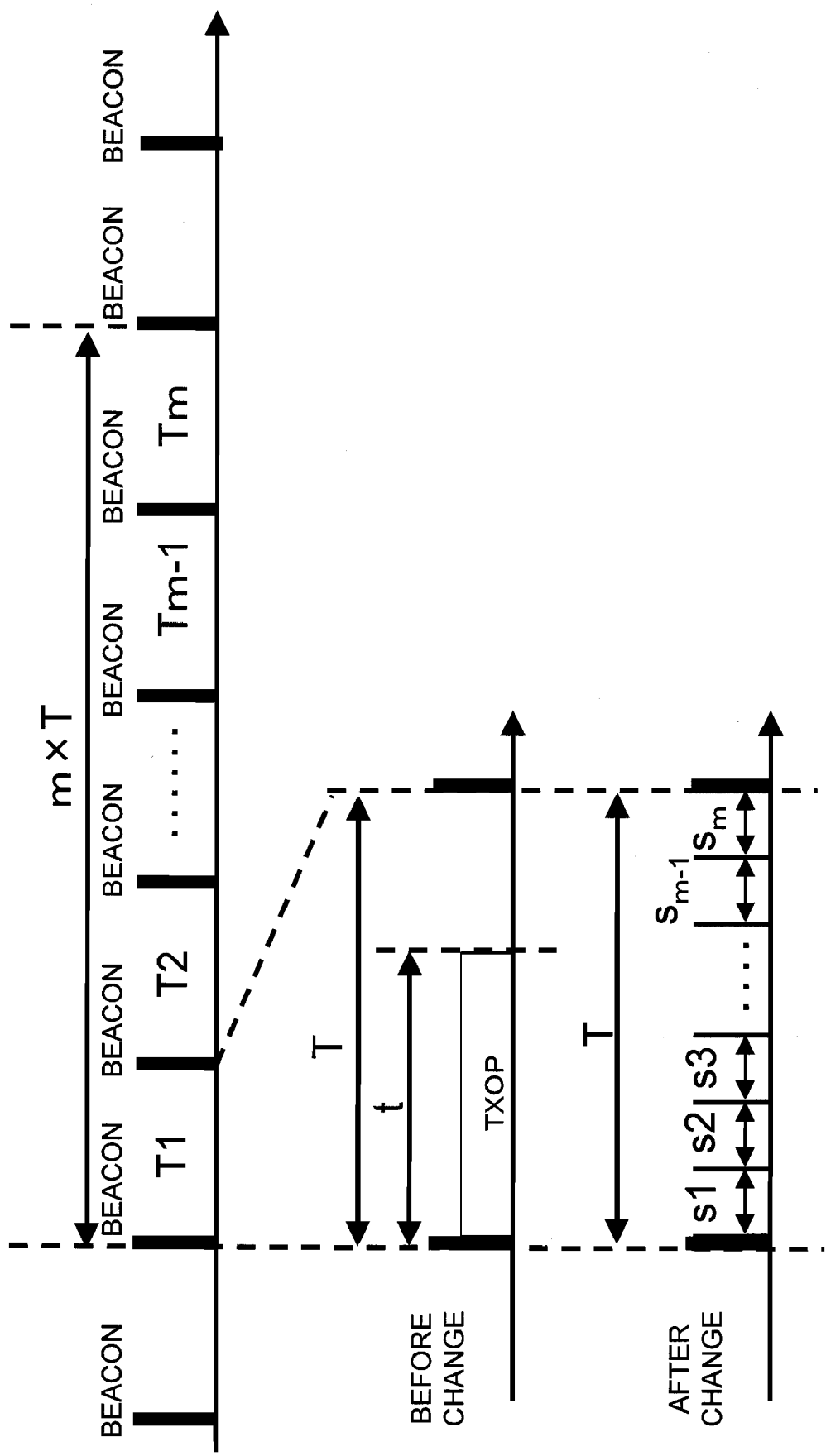
FIG. 7 is a time chart illustrating a method of changing the TXOP allocation by using the plurality of beacon segments according to the embodiment 1 of the present invention.

Alternatively, as shown in FIG. 7, the scheduling may be changed such that one beacon segment is divided into m time slots (s1 to sm), and a position of a time slot during which no TXOP is allocated is shifted one by one in a plurality of continuous beacon segments.

Specifically, in the case where m beacon segments are used as one unit, a first band s1 is a TXOP prohibited time band in the beacon segment T1, a second band s2 is the TXOP prohibited time band in the beacon segment T2, and in the same manner, an m-th band sm is the TXOP prohibited time band in a beacon segment Tm. As such, an x-th time slot sx is the TXOP prohibited time band in a beacon segment Tx.

Figure 8:
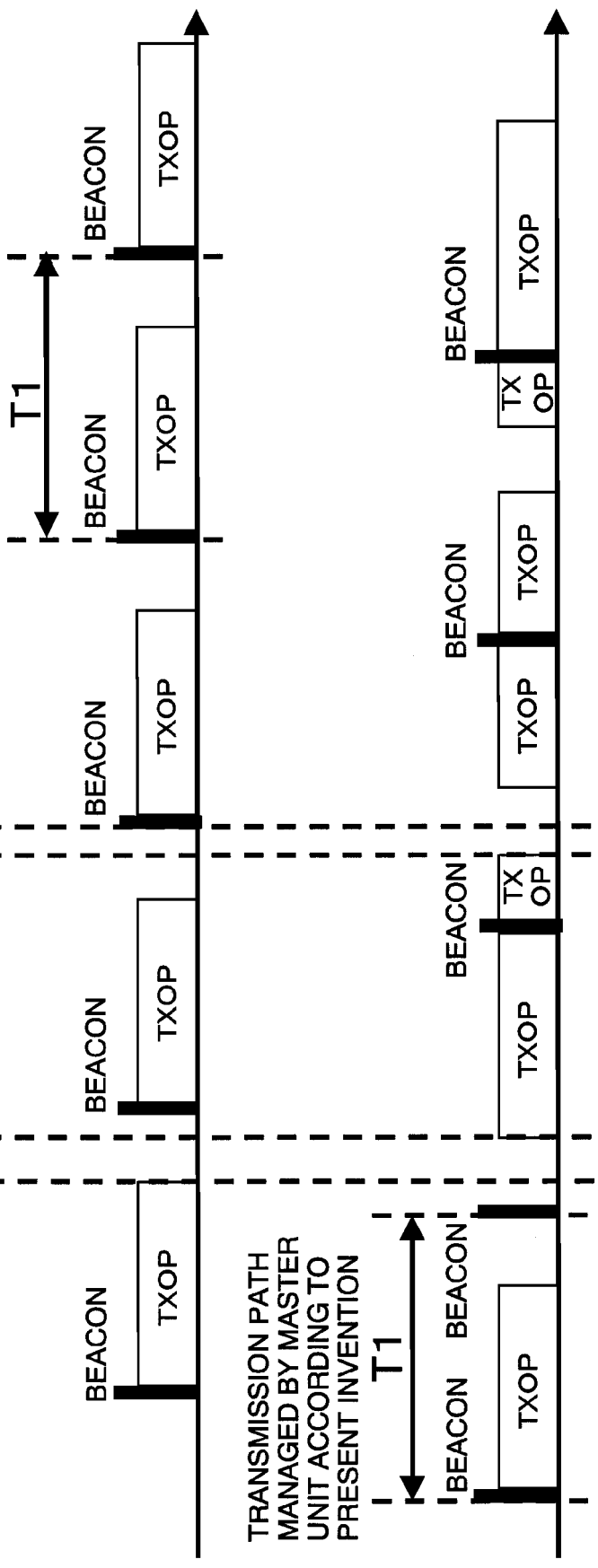
FIG. 8 is a time chart illustrating a comparison between statuses the transmission paths whose bands are respectively managed according to the embodiment 1 of the present invention.

As described above, the scheduling is performed such that a position of a time slot during which no TXOP is allocated is shifted one by one in the plurality of continuous beacon segments, thereby also making it possible to maintain the communication quality (throughput) which is initially assured. Also, as shown in FIG. 8, a time band during which no TXOP is allocated can be provided at the same time as that provided in a transmission path whose band is managed by another master unit device. In this time band, no wait time is generated during the RTT test, and thus the RTT test can be completed successfully between Source and Sink.

Note that one time slot length (time length) is preferably set to be equal to or greater than 7 msec which is a time limit of the RTT test.

(Embodiment 2)

In an embodiment 2, described in detail will be a master unit device which estimates a subsequent retry timing of the RTT test based on a relay time of a frame relating to the RTT test, and provides a TXOP allocation prohibited time band in the vicinity of the retry timing, thereby making it possible not to generate any wait time during the RTT test.

Figure 9:
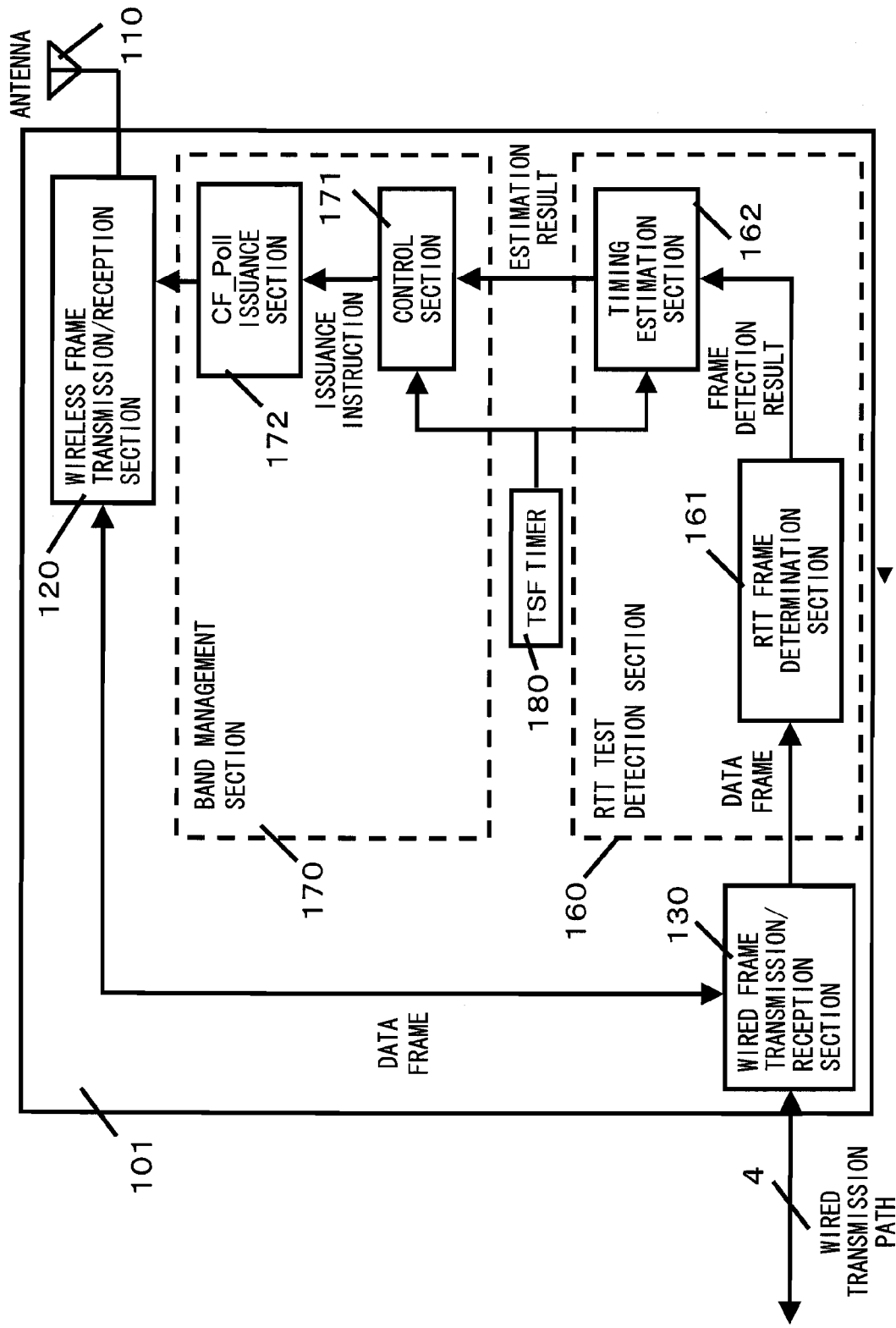
FIG. 9 is a block diagram illustrating a configuration of the master unit device according to an embodiment 2 of the present invention.

FIG. 9 is a block diagram illustrating a configuration of a master unit device 101 according to the embodiment 2 of the present invention. In FIG. 9, the same components as those in FIG. 1 will be denoted by the same reference numerals and will not be further described below.

As shown in FIG. 9, the master unit device 101 comprises the antenna 110, the wireless frame transmission/reception section 120, and the wired frame transmission/reception section 130. These components operate in the same manner as described in the embodiment 1. The master unit device 101 further comprises an RTT test detection section 160, a band management section 170, and a TSF timer 180. The RTT test detection section 160 includes an RTT frame determination section 161 and a timing estimation section 162. The band management section 170 includes a control section 171 and a CF_Poll issuance section 172.

A TSF timer 180 is a 64-bit counter for counting a time every μsec. The TSF timer 180 outputs a counter value indicating temporal information (TSF timer value) to the timing estimation section 162 and the control section 171.

The RTT frame determination section 161, to which a copied data frame is inputted from the wired frame transmission/reception section 130, determines whether or not the inputted data frame is an RTT_TEST(MAC1A).CMD frame or an ACCEPTED(MAC2B).RSP frame, both of which are frames relating to the RTT test. When it is determined that the data frame is either of the frames, the RTT frame determination section 161 notifies the timing estimation section 162, as a frame detection result, that a relay process is executed on a frame relating to the RTT test.

The timing estimation section 162 calculates a timing at which the RTT test was implemented based on the frame detection result notified from the RTT frame determination section 161 and the TSF timer value obtained from the TSF timer 180, estimates a time in the vicinity of the calculated timing as a time band during which no TXOP is allocated in another transmission path, and notifies the control section 171 of the estimation result (time band).

Based on the estimation result notified from the timing estimation section 162, i.e., the estimation result indicating a time band during which no TXOP is allocated in said another transmission path, the control section 171 determines the aforementioned time band as a TXOP allocation prohibited time band so as to perform the scheduling such that a TXOP is allocated in a time band other than the TXOP allocation prohibited time band. In accordance with this scheduling, the CF_Poll issuance section 172 issues a CF_Poll frame so as to allocate a TXOP to a slave unit (not shown) managed by the master unit device.

Operations of the RTT test detection section 160 and the band management section 170 will be described in more detail with reference to FIG. 10 and FIG. 11.

Figure 10:
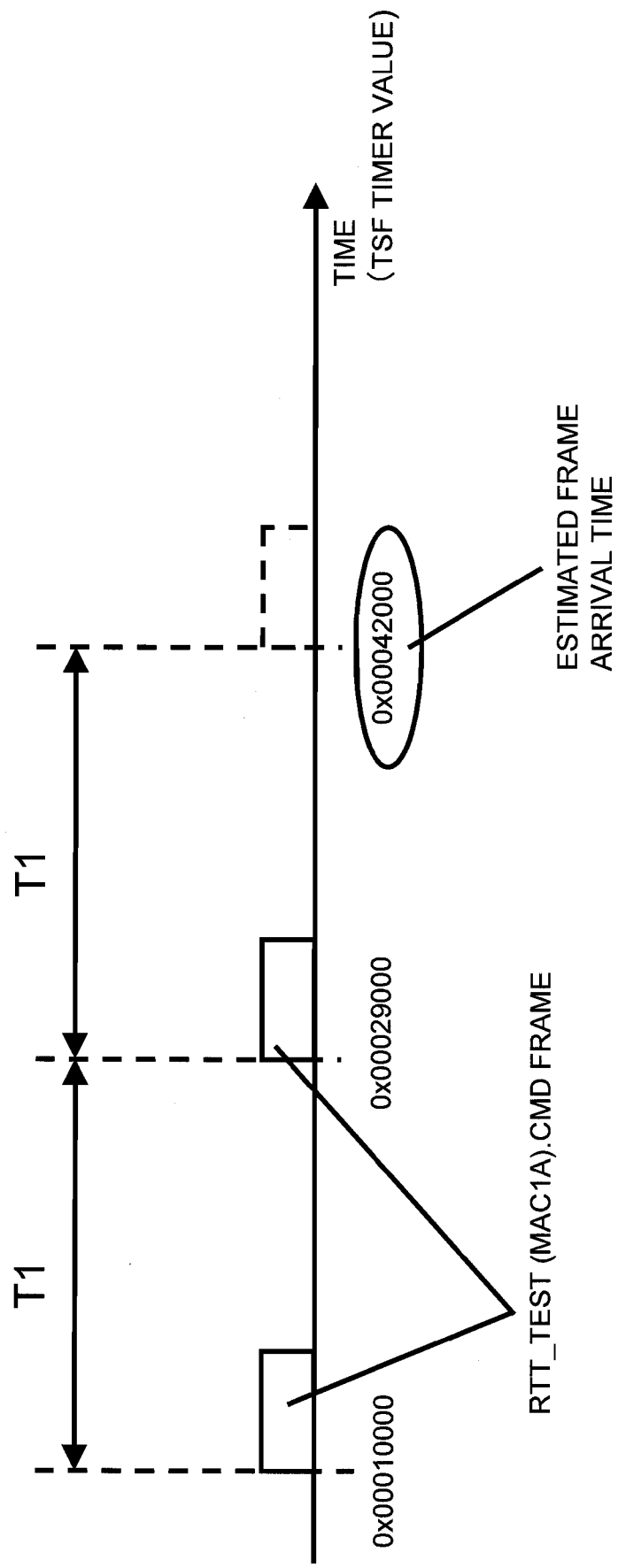
FIG. 10 is a time chart illustrating detection of an RTT test frame and a timing estimation according to the embodiment 2 of the present invention.

FIG. 10 is a diagram illustrating the detection of an RTT_TEST(MAC1A).CMD frame and a timing estimation. To the RTT frame determination section 161, a data frame received from the wired frame transmission/reception section 130 via the wired transmission path 4 is inputted. Upon determining that the inputted data frame is an RTT_TEST (MAC1A).CMD frame, the RTT frame determination section 161 notifies the timing estimation section 162 of the detection of the RTT_TEST(MAC1A).CMD frame.

To the timing estimation section 162, the TSF timer value is inputted from the TSF timer 180 at all times. The timing estimation section 162 samples the TSF timer value obtained at a time when the notification about detection is received from the RTT frame determination section 161. For example, in an example shown in FIG. 10, the RTT_TEST(MAC1A).CMD frame is detected at timings where the TSF timer values are 0x00010000 and 0x00029000, and thus these values are sampled. Note that the aforementioned timer values are represented in hexadecimal notation.

Furthermore, the timing estimation section 162 calculates an interval T1 at which the RTT test is implemented based on a difference between the sampled TSF timer values, and then estimates a TSF timer value to be obtained at a time when a subsequent RTT_TEST(MAC1A).CMD frame arrives. For example, in the example shown in FIG. 10, the interval T1 is calculated as 0x19000. Therefore, an estimated arrival time (TSF timer value) will be 0x00042000 which is obtained by adding the interval T1 to 0x00029000. The timing estimation section 162 notifies the control section 171 of this estimated arrival time (TSF timer value) as the estimation result. This estimation result affects a TXOP prohibited time band to be used when performing a scheduling for managing a communication time band of a slave unit.

Figure 11:
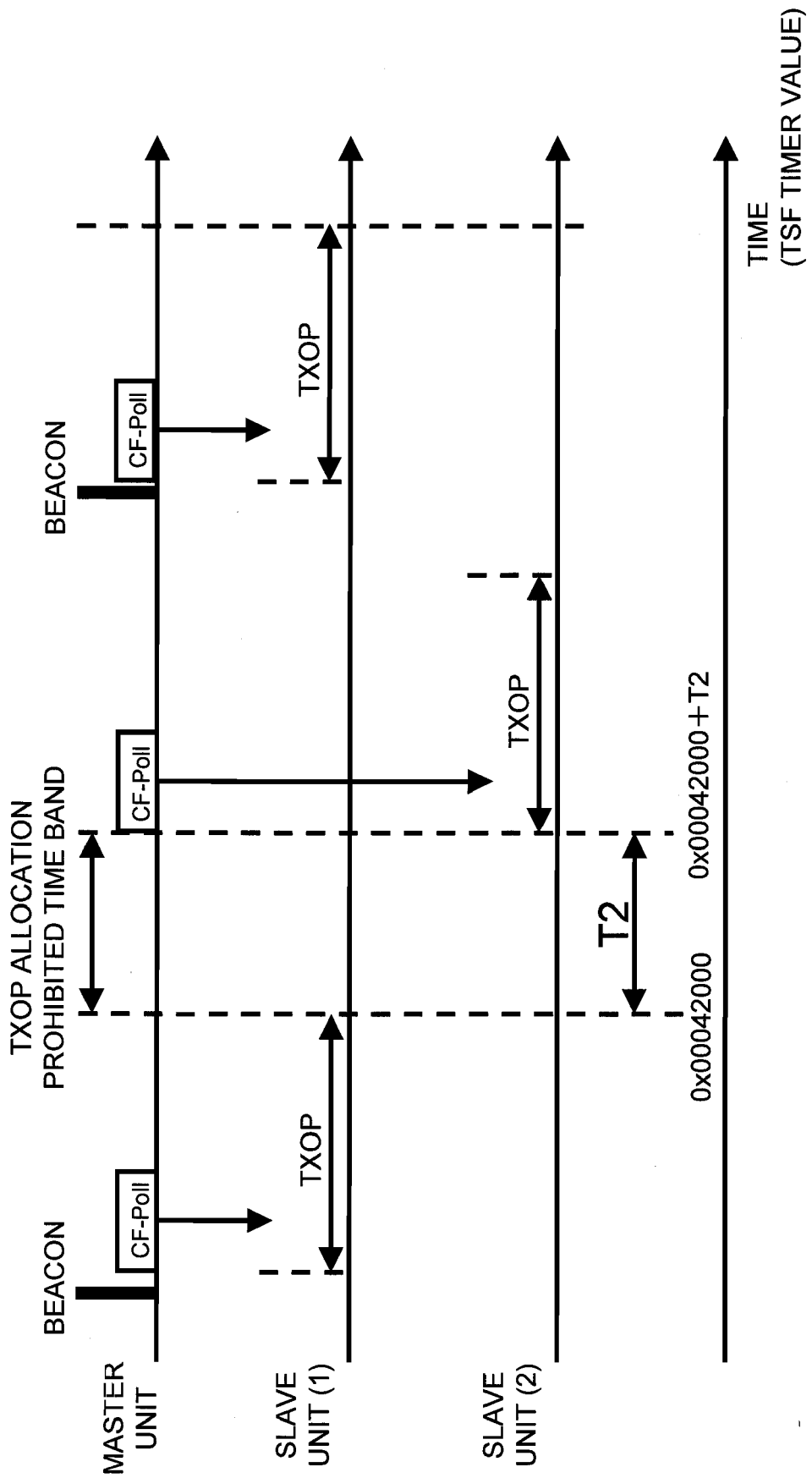
FIG. 11 is a time chart illustrating an example where a TXOP is allocated based on the timing estimation according to the embodiment 2 of the present invention.

FIG. 11 is a diagram illustrating an example where the TXOP is allocated based on the estimated arrival time notified from the timing estimation section 162. From the TSF timer 180, the same temporal information as that inputted to the timing estimation section 162 is inputted to the control section 171. The control section 171 sets a TXOP allocation prohibited time band based on the estimated arrival time (TSF timer value) notified from the timing estimation section 162. Specifically, the control section 171 sets a TXOP prohibited time band during which no CF-Poll is issued to a slave unit, in a time length T2 which is preset from the estimated arrival time having been notified. For example, in the case where the estimated time notified from the timing estimation section 162 is 0x00042000, the control section 171 sets, as the TXOP prohibited time band, a time period indicated by the timer values from 0x00042000 to 0x00042000+T2, which are inputted from the TSF timer 180. The control section 171 instructs the CF_Poll issuance section 172 to issue a CF_Poll frame in a time band other than the TXOP prohibited time band having been set. The CF_Poll issuance section 172 issues a CF_Poll frame in accordance with the instruction.

Note that it is desirable that a length of the T2 determining a time length of the TXOP prohibited time band is set to be equal to or greater than 7 msec which is a time limit of the RTT test.

As described above, in the present embodiment, a subsequent time to reimplement the RTT test is estimated based on a relay timing of the RTT_TEST(MAC1A).CMD frame so as to provide, in the vicinity of the estimated timing, the TXOP allocation prohibited time band, i.e., a time band during which no CF-Poll frame is issued to a slave unit. As a result, in this time band, no wait time is generated during the RTT test, and thus the RTT test can be completed successfully between Source and Sink.

Note that the present embodiment illustrates an example where a subsequent time to reimplement the RTT test is estimated based on the relay timing of the RTT_TEST (MAC1A).CMD frame. However, the present embodiment is not limited to this example. For example, the time to reimplement the RTT test maybe estimated based on a relay timing of the ACCEPTED(MAC2B).RSP frame which is a response frame, not based on the relay timing of the RTT_TEST (MAC1A).CMD frame. Even when either of the frames is used, a subsequent time to implement the RTT test is estimated by using a frame, relating to the RTT test, which is received by the wired frame transmission/reception section 130 from the wired transmission path 4, thereby making it possible not to generate any wait time during the RTT test.

(Embodiment 3)

In an embodiment 3, described in detail will be master unit devices which perform a negotiation between the master unit devices respectively managing bands, so as to provide a common TXOP allocation prohibited time band between the master unit devices, thereby making it possible not to generate any wait time during the RTT test.

Figure 12:
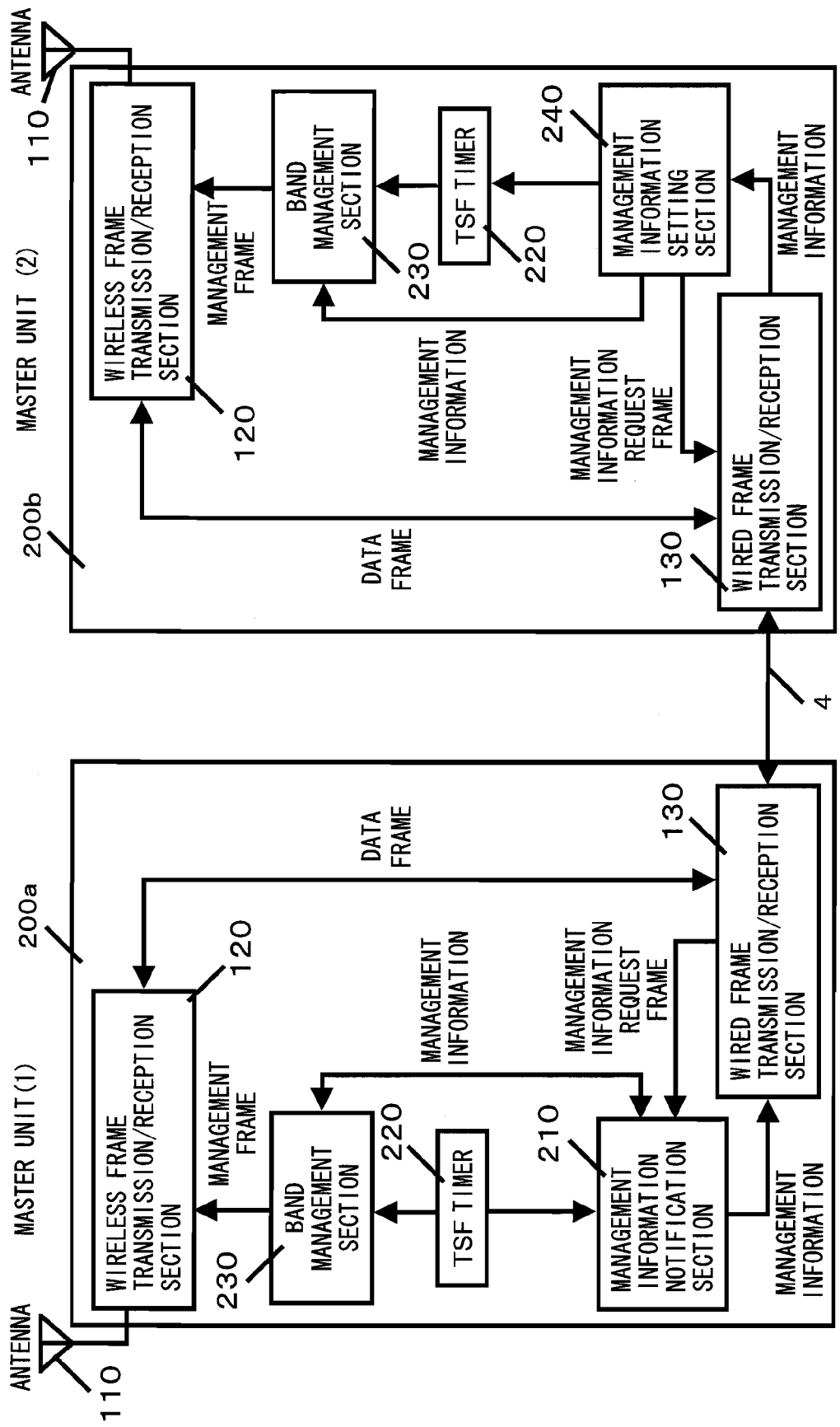
FIG. 12 is a block diagram illustrating configuration of the master unit device according to an embodiment 3 of the present invention.

FIG. 12 is a block diagram illustrating a configuration including a master unit device(1)200*a* and a master unit device(2)200*b* according to the embodiment 3 of the present invention. FIG. 12 shows the configuration in which the master unit device(2)200*b* obtains band management information owned by the master unit device(1)200*a*, and manages its band of a slave unit based on the obtained band management information. In FIG. 12, the same components as those in FIG. 1 will be denoted by the same reference numerals and will not be further described below.

As shown in FIG. 12, each of the master unit device(1)200*a* and the master unit device(2)200*b* comprises the antenna 110, the wireless frame transmission/reception section 120, and the wired frame transmission/reception section 130. These components operate in the same manner as described in the embodiment 1.

The master unit device(1)200*a* further comprises a management information notification section 210, a TSF timer 220, and a band management section 230. The master unit(2) 200*b* further comprises a management information setting section 240, a TSF timer 220, and a band management section 230.

To the management information notification section 210, a data frame received by the wired frame transmission/reception section 130 is inputted. When the inputted data frame is a request frame indicating a transmission request of band management information (a management information request frame), the management information notification section 210 creates a management information frame in which a TSF timer value inputted from the TSF timer 220 and a TXOP allocation prohibited time band set by the band management section 230 are written. The TXOP allocation prohibited time band is designated by the TSF timer value. The management information frame is transmitted from the wired frame transmission/reception section 130 to the master unit device(2) 200*b* which has requested the management information frame.

The TSF timer 220 is a 64-bit counter for counting a time every μsec. The TSF timer 220 outputs a counter value indicating temporal information, i.e., the TSF timer value to the band management section 230 and the management information notification section 210.

To the band management section 230, the counter value indicating the temporal information (TSF timer value) is inputted from the TSF timer 220. The band management section 230 generates a CF-Poll frame for allocating a TXOP to a slave unit (not shown) managed by each master unit device in a time band other than the preset TXOP allocation prohibited time band (which is designated by the TSF timer value). The generated CF-Poll frame is transmitted from the wireless frame transmission/reception section 120. The low-order two bytes of the TSF timer value indicate the TXOP prohibited time band. For example, in the case where the TXOP allocation prohibited time band is set from 0x4000 to 0x6000, a TXOP prohibited time band having a length of approximately 8 msec is set at a cycle of approximately 65 msec.

Upon startup of the master unit device(2)200*b*, the management information setting section 240 generates a management information request frame for obtaining, from the master unit device(1)200, the band management information including information on the TSF timer value and the time band during which a TXOP is allocated, in order to cause a TSF timer value and a time band during which a TXOP is allocated to coincide with those of the master unit device(1) 200*a*. The management information setting section 240 outputs the generated management information request frame to the wired frame transmission/reception section 130. The wired frame transmission/reception section 130 transmits the inputted management information request frame to the wired transmission path 4. Also, the management information setting section 240, to which a data frame received by the wired frame transmission/reception section 130 is inputted, detects that the frame is the management information frame transmitted from the master unit device(1)200*a*. Furthermore, the management information setting section 240 obtains the TSF timer value and the TXOP allocation prohibited time band of the master unit device(1)200*a* from the management information frame. The management information setting section 240 sets the TSF timer value of the master unit device(1)200*a* in its own TSF timer 220, and sets a range of the TSF timer value in its own time management section 230 so as to indicate the same TXOP allocation prohibited time band as that of the master unit device(1)200*a*.

Hereinafter, described will be an operation in which the master unit device(1)200*a* and the master unit device(2)200*b*, each managing its band, negotiate with each other so as to cause a TXOP allocation prohibited time band of the master unit device(2)200*b* to coincide with that of the master unit device(1)200*a*, thereby allowing each of the master unit devices to manage its band of a slave unit in a time band other than the prohibited time band.

Upon startup, the master unit(2)200*b* causes the management information setting section 240 to create a management information request frame. The master unit(2)200*b* transmits the management information request frame from the wired frame transmission/reception section 130 to the master unit (1)200a.

On the other hand, the master unit(1)200a causes the management information notification section 210 to determine whether or not a wired frame received by the wired frame transmission/reception section 130 is the aforementioned management information request frame. Upon determining that the wired frame is the management information request frame, the management information notification section 210 creates a management information frame in which a TXOP allocation prohibited time band set by the band management section 230 and a timer value of the TSF timer 220 are written. The wired frame transmission/reception section 130, to which the management information frame is inputted, transmits the inputted management information frame from the management information notification section 210 to the master unit device(2)200b. FIG. 13 shows an exemplary format of the management information frame.

The master unit device(2)200b causes the management information setting section 240 to determine whether or not the wired frame received by the wired frame transmission/reception section 130 is the management information frame transmitted from the master unit device(1)200a. When it is determined that the wired frame is the management information frame, the management information setting section 240 obtains, from the management information frame, the TSF timer value and the TXOP allocation prohibited time band of the master unit device(1)200a, and sets the TSF timer value of the master unit device(1)200a in the TSF timer 220 of the master unit device(2) 200b, thereby synchronizing the TSF timer 220 of the master unit device(1)200a and the TSF timer 220 of the master unit device(2)200b. Furthermore, the management information setting section 240 sets a range of the TSF timer value in the band management section 230 of the master unit device(2)200b so as to indicate the same TXOP allocation prohibited time band as that of the master unit device(1)200a.

Thereafter, the TSF timers 220 of the respective master unit device(1)200a and the master unit device(2)200b are substantially synchronized with each other, and a common TXOP allocation prohibited time band is set between the master unit device (1)200a and the master unit device(2)200b. In this state, each of the master unit device(1)200a and the master unit device(2)200b causes the band management section 230 to manage its band of the slave unit. FIG. 14 shows an example of this case. FIG. 14 is a diagram illustrating a time chart in a case where a TXOP allocation prohibited time band is set by the TSF timer value from 0x4000 to 0x6000. Each of the master unit(1)200a and the master unit(2)200b provides a TXOP allocation prohibited time band when the low-order two bytes of the TSF timer value indicate a value from 0x4000 to 0x6000, and no CF-Poll is issued to the slave unit in the TXOP allocation prohibited time band.

Note that it is desirable that a length of the TXOP allocation prohibited time band is set so as to be equal to or greater than 7 msec which is a time limit of the RTT test.

As described above, in the present embodiment, a negotiation is performed between master unit devices, each managing its band, thereby synchronizing the TSF timers of the respective master unit devices and also providing a common TXOP allocation prohibited time band between the master unit devices. Thus, in a plurality of transmission paths whose bands are managed, it becomes possible to assuredly provide, in all the transmission paths, a time band during which no TXOP is allocated, i.e., a time band during which no wait time is generated in the RTT test. Therefore, the RTT test can be completed successfully between Source and Sink.

Note that the present embodiment illustrates an example where a negotiation is performed between the master units, each managing its band, thereby synchronizing the TSF timers 220 of the respective master units and also providing the common TXOP allocation prohibited time band between the master units. However, the present embodiment may be modified so as to have a configuration as described below. That is, the TSF timers of the respective master units may be synchronized with each other and beacon intervals of the respective master units may have the same length as each other. This is because a scheduling is generally performed such that a TXOP is collectively allocated in each starting portion of a beacon segment, and no TXOP is usually allocated in a time period immediately preceding the beacon. Specifically, the same beacon interval is previously set between the master unit devices, and the master unit device (1)200a, for example, broadcasts a beacon also to the wired transmission path 4 on a regular basis. Furthermore, the master unit(2)200b to be started up later obtains a TSF timer value (which is added to the beacon as a time stamp) based on the beacon transmitted from the master unit(1)200a, and sets the TSF timer value in its own TSF timer 220. This configuration does not place high priority on providing a time band during which no TXOP is allocated. Thus, in comparison to the present embodiment, it is not necessarily possible to produce an effect that the master unit devices are able to share a common time band during which no TXOP is allocated. However, a new effect such as a size reduction of circuit size or the like can be separately obtained.

Note that in the present embodiment, the master unit device (2)200b requests the master unit device(1)200a to transmit the management information. However, the master unit device(1)200a may transmit a management information frame voluntarily. Alternatively, instead of requesting the management information frame only upon startup, the master unit device(2)200b may request the management information frame so as to correct its own TSF timer 220 on a regular basis.

Furthermore, in the present embodiment, the master unit device(1)200a transmits the management information frame via the wired transmission path 4. However, the master unit device(1)200a may transmit the management information frame via a wireless transmission path. For example, when the master unit device(1)200a is initially started up, information relating to a TXOP prohibited time band is included in a beacon. Immediately after startup, the master unit device(2) 200b adjusts its channel to a wireless channel of the master unit device(1)200a so as to receive a beacon transmitted from the master unit device(1)200a and also to obtain, from the beacon, information on the TSF timer value (which is added to the beacon as a time stamp) and the TXOP prohibited time band. Thereafter, the master unit device(2)200b sets its own device so as to be in a state represented by the obtained information. Therefore, the TSF timer value of the master unit device(2)200b can be synchronized with the TSF timer value of the master unit device(1)200a, and a common TXOP allocation prohibited time band also can be provided between the master unit devices, thereby making it possible to allow each of the master unit devices to manage its band in a state mentioned above. After obtaining necessary information from the beacon transmitted from the master unit device(1)a, the master unit device(2)200b changes its own wireless channel in order to effectively use a frequency. If such a configuration is adopted, an effect similar to that of the present embodiment can be obtained.

(Embodiment 4)

Figure 15:
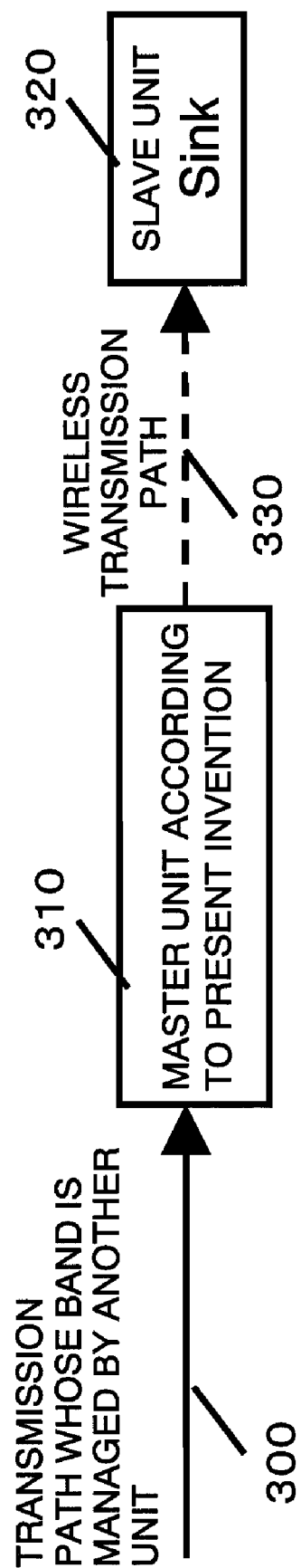
FIG. 15 is a block diagram illustrating a master unit device and a slave unit according to an embodiment 4 of the present invention.
Figure 16:
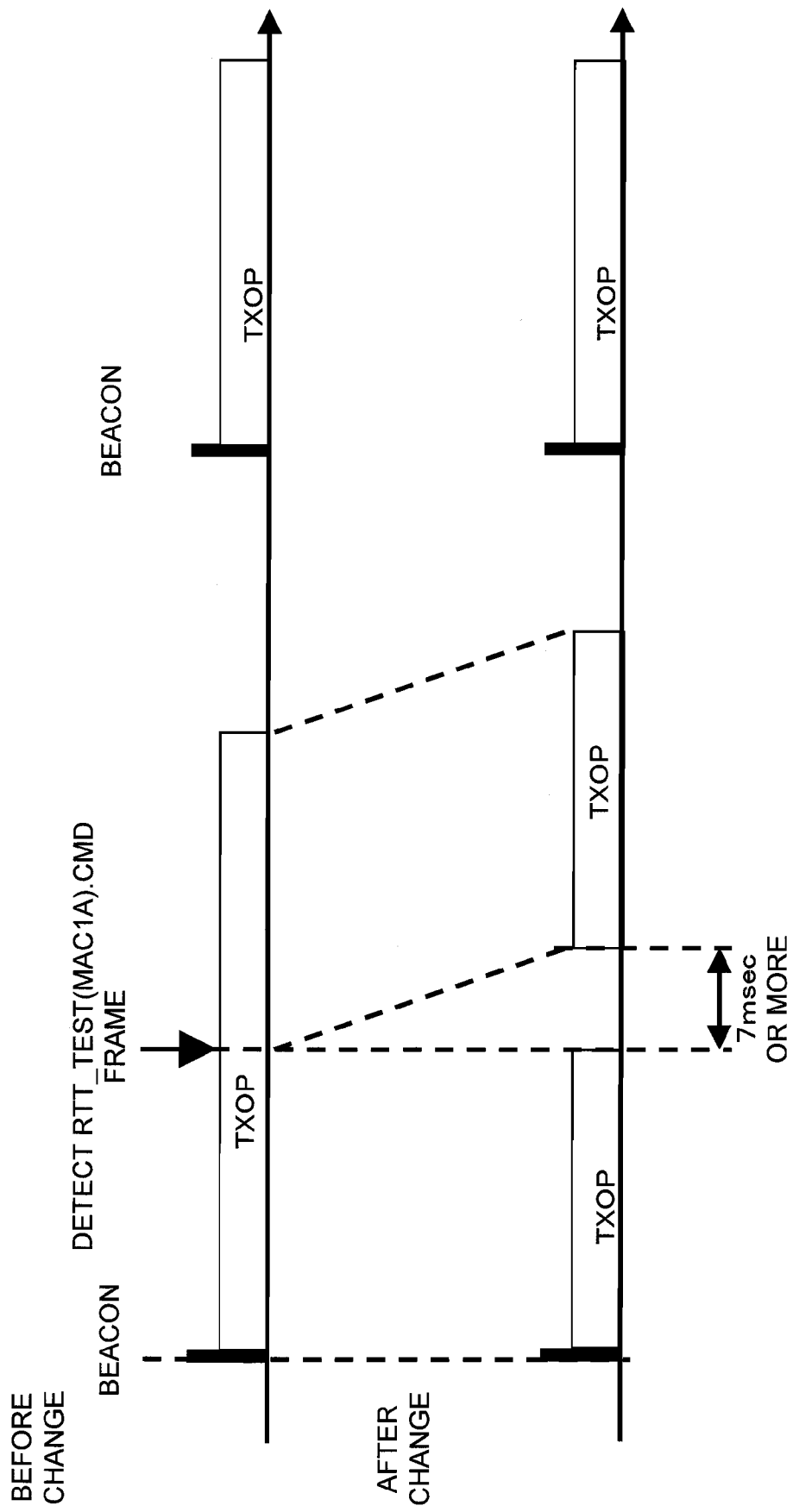
FIG. 16 is a time chart illustrating modification of the band management schedule according to the embodiment 4 of the present invention.
Figure 17:
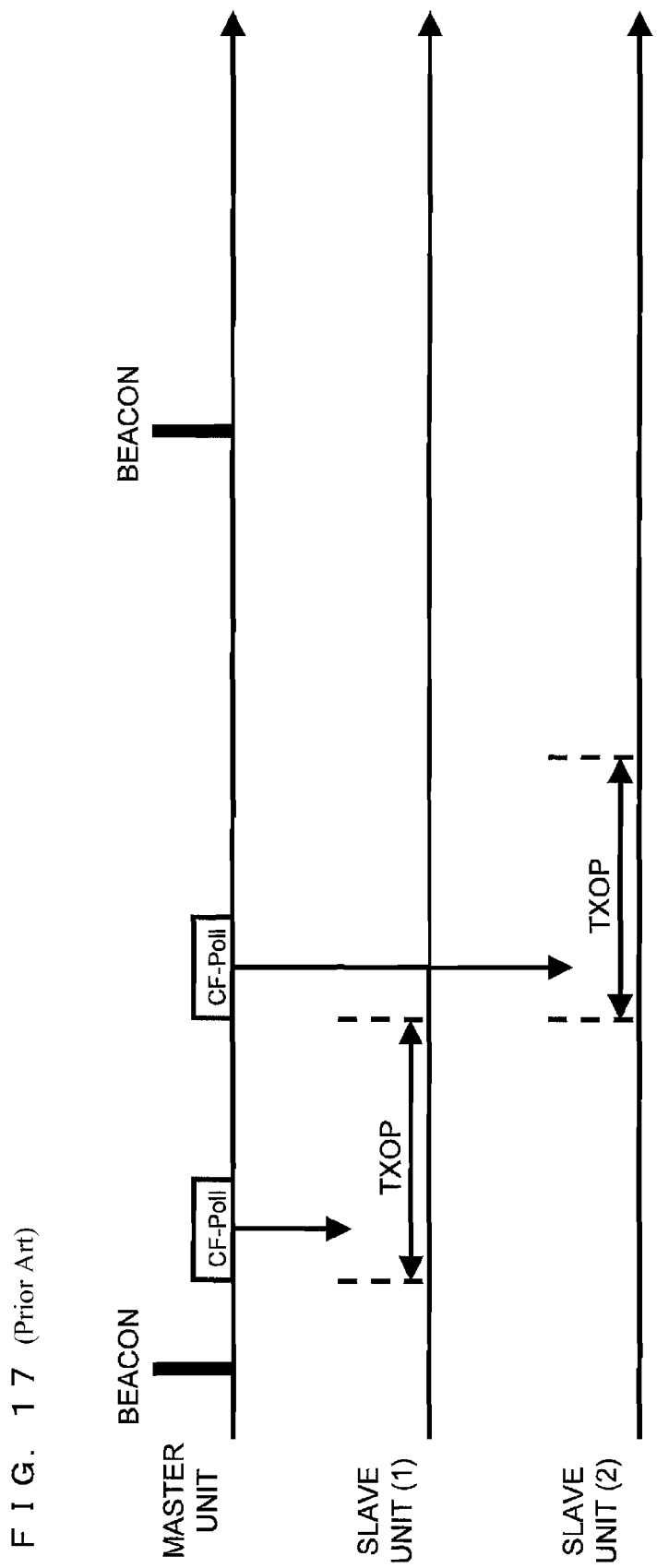
FIG. 17 is a diagram illustrating conventional band management method.
Figure 18:
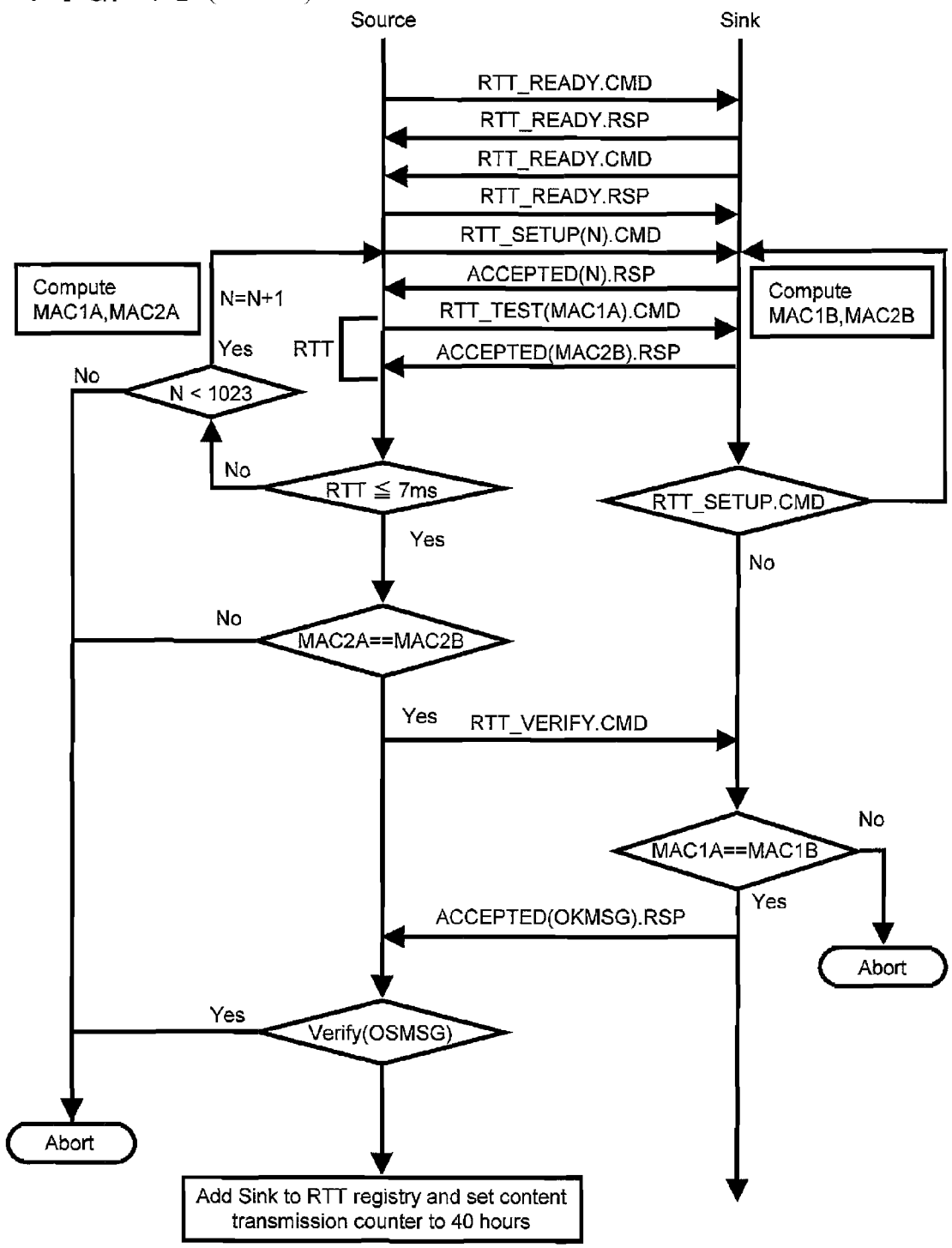
FIG. 18 is a diagram illustrating authentication steps in DTCP-IP according to the prior art.
Figure 19:
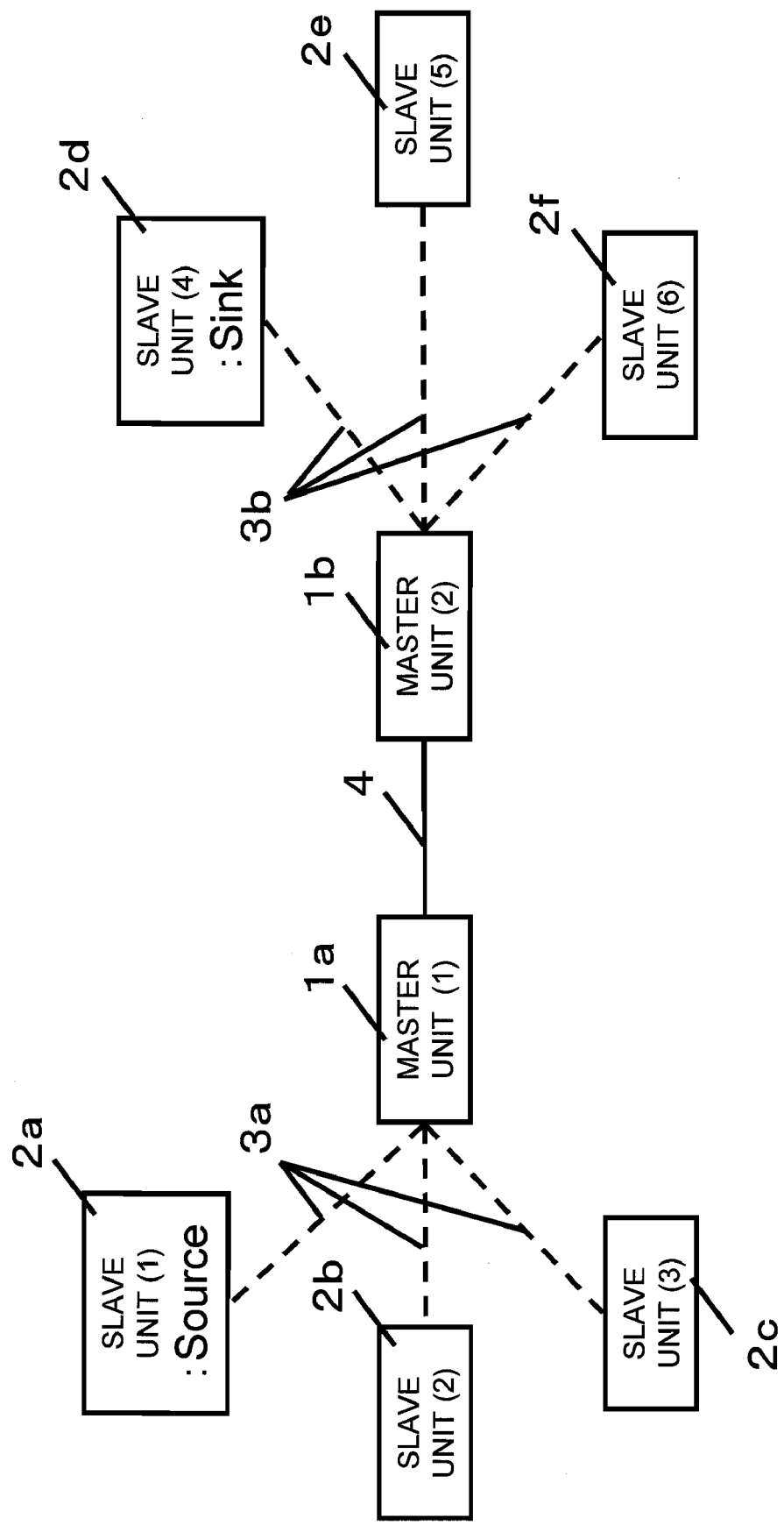
FIG. 19 is a diagram illustrating a conventional network configuration.

In an embodiment 4, upon detecting that the RTT test is implemented, a master unit device immediately modifies a band management schedule which is initially set. FIG. 15 is a diagram illustrating a network including a master unit device according to the present embodiment. FIG. 16 is a time chart illustrating a method of changing a TXOP allocation by using a beacon segment according to the present embodiment.

As shown in FIG. 15, a transmission path 300, whose band is managed by another master unit device (not shown), is connected to a slave unit 320 via a master unit device 310 according to the present embodiment. The transmission path 300, whose band is managed by said another master unit device, may be a power-line carrier communication (PLC) line, for example. The master unit device 310 according to the present embodiment manages a band of the wireless transmission path 330 connected to the slave unit 320.

The master unit device 310 according to the present embodiment is capable of detecting a reception of an RTT_TEST(MAC1A).CMD which is a frame for implementing the RTT test on the slave unit 320 via the transmission path 300 whose band is managed by said another master unit device (not shown). As shown in FIG. 16, upon detecting the RTT_TEST(MAC1A).CMD, the master unit device 310 immediately modifies a TXOP allocation schedule of the wireless transmission path 330. The master unit device 310 relays the RTT_TEST(MAC1A).CMD frame to the slave unit 320. At the same time, the master unit device 310 provides a time band during which no TXOP is allocated and which has a length of 7 msec or more within a beacon segment. Even if an RTT_TEST(MAC1A).CMD frame is detected in a time period as TXOP, a time band during which no TXOP is allocated is immediately provided. That is, when an RTT_TEST(MAC1A).CMD frame is detected in a time period as TXOP, a band during which no TXOP is allocated breaks into the time period so as to shift back a portion, of a TXOP frame, remaining after the frame is detected.

With this configuration, no wait time is generated in the wireless transmission path 330 during the RTT test, and thus the RTT test can be completed successfully between Source and Sink.

Note that the present embodiment is not limited to the aforementioned example. Similarly to the embodiment 1, a wired transmission path, which is connected to another master unit device, but whose band is hot managed by any of the master unit devices, may be used instead of the transmission path 300 whose band is managed by another master unit device.

The functional blocks described in the respective embodiments are typically implemented as LSIs, integrated circuits. These functional blocks may be individually integrated on a single chip or may also be integrated on a single chip so as to include a part or the whole thereof.

Here, the term, LSI is used, but it may also be referred to as IC, system LSI, super LSI or ultra-LSI or the like depending on the difference in the degree of integration.

Furthermore, the technique of implementing an integrated circuit is not limited to an LSI, but an integrated circuit may also be implemented with a dedicated circuit or general-purpose processor. It is also possible to use an FPGA (Field Programmable Gate Array) which is programmable after manufacturing an LSI or a reconfigurable processor whereby connections or settings of circuit cells inside the LSI are reconfigurable.

Moreover, when technologies for implementing an integrated circuit substitutable for an LSI emerges with the advance of semiconductor technology or other derived technologies, those technologies may of course be used to integrate functional blocks.

Industrial Applicability

A master unit device according to the present invention and a band management method used by the same master unit device have an effect to reduce a delay time during an RTT test generated due to a plurality of transmission paths which are being connected and whose bands are respectively managed. The master unit device according to the present invention and the band management method used by the same master unit device are applicable as a system including DTCP-IP authentication which requires a high response speed.

The invention claimed is:

1. A master unit device which forms a unit network in cooperation with a first slave unit and manages a communication time band of the first slave unit, the master unit device comprising:

RTT test detection means for detecting, when an RTT (Round Trip Time) test is implemented from a second slave unit included in another unit network, an implementation of the RTT test; and band management means for modifying, when the RTT test detection means detects the implementation of the RTT test, a band management schedule of the first slave unit managed by the master unit device.

2. The master unit device according to claim 1, wherein the RTT test detection means detects a re-implementation of the RTT test, and wherein the band management means modifies, when the RTT test detection means detects the re-implementation of the RTT test, the band management schedule of the first slave unit managed by the master unit device.

3. The master unit device according to claim 1, wherein the RTT test is implemented in an authentication procedure of DTCP-IP (Digital Transmission Content Protection over Internet Protocol).

4. The master unit device according to claim 1, wherein the master unit device is a wireless communication device which complies with an IEEE802.11e standard, and the band management schedule is modified by changing a beacon interval.

5. The master unit device according to claim 1, wherein the master unit device is a wireless communication device which complies with an IEEE802.11e standard, and the band management schedule is modified by changing an allocation schedule of a TXOP (Transmission Opportunity).

6. A master unit device which forms a unit network in cooperation with a first slave unit and manages a communication time band of the first slave unit, the master unit device comprising:

RTT test detection means for detecting, when an RTT (Round Trip Time) test is implemented from a second slave unit included in another unit network, an implementation of the RTT test, and for estimating a subsequent re-implementation time of the RTT test based on a result of the detecting of the implementation of the RTT test; and band management means for not allocating a communication occupancy right to the first slave unit managed by the master unit device in a time period having a constant time length from the re-implementation time of the RTT test estimated by the RTT test detection means.

7. The master unit device according to claim 6, wherein the RTT test is implemented in an authentication procedure of DTCP-IP (Digital Transmission Content Protection over Internet Protocol), and the constant time length is equal to or greater than 7 msec.

8. The master unit device according to claim 6, wherein the master unit device is a wireless communication device which complies with an IEEE802.11e standard, and the communication occupancy right is allocated by allocating a TXOP (Transmission Opportunity).

9. A master unit device which forms a unit network in cooperation with a first slave unit and manages a communication time band of the first slave unit, the master unit device comprising:
   management information setting means for synchronizing (i) a timer used for a second band management performed by another master unit device performing the second band management of a second slave unit included in another unit network, and (ii) a timer used for a first band management performed by the master unit device; and
   band management means for modifying, when a RTT test detection means detects an implementation of an RTT (Round Trip Time) test, a band management schedule of the first slave unit managed by the master unit device.

10. The master unit device according to claim 9, wherein the master unit device is a wireless communication device which complies with an IEEE802.11e standard, and each of the timer used for the second band management and the timer used for the first band management is a TSF timer.

11. A master unit device which forms a unit network in cooperation with a first slave unit and manages a communication time band of the first slave unit, the master unit device comprising:
   management information setting means for performing a negotiation between the master unit device and another master unit device managing a second slave unit included in another unit network so as to synchronize the master unit device with the another master unit device, and for setting, in the master unit device, a time period during which a first communication occupancy right is not allocated to the first slave unit, such that the time period set in the master unit device is set in a same time period as that of the another master unit device; and
   band management means for not allocating a second communication occupancy right in the time period during which the communication occupancy right is not allocated to the first slave unit, as set by the management information setting means.

12. The master unit device according to claim 11,
   wherein the master unit device is a wireless communication device which complies with an IEEE802.11e standard,
   wherein the master unit device and the another master unit device are synchronized together by synchronizing a TSF timer of the master unit device and a TSF timer of the another master unit device, and
   wherein the first communication occupancy right and the second communication occupancy right are allocated by allocating a TXOP (Transmission Opportunity).

13. A band management method, of managing a communication time band of a first slave unit, used by a master unit device which forms a unit network in cooperation with the first slave unit, the band management method comprising:
   an RTT test detection step of detecting, when an RTT (Round Trip Time) test is implemented from a second slave unit included in another unit network, an implementation of the RTT test; and
   a band management step of modifying, when the RTT test detection step detects the implementation of the RTT test, a band management schedule of the first slave unit managed by the master unit device.

14. A band management method, of managing a communication time band of a first slave unit, used by a master unit device which forms a unit network in cooperation with the first slave unit, the band management method comprising:
   an RTT test detection step of detecting, when an RTT (Round Trip Time) test is implemented from a second slave unit included in another unit network, an implementation of the RTT test, and for estimating a subsequent re-implementation time of the RTT test based on a result of the detecting of the implementation of the RTT test; and
   a band management step of not allocating a communication occupancy right to the first slave unit managed by the master unit device in a time period having a constant time length from the re-implementation time of the RTT test estimated by the RTT test detection step.

15. A band management method, of managing a communication time band of a first slave unit, used by a master unit device which forms a unit network in cooperation with the first slave unit, the band management method comprising:
   a management information setting step of synchronizing (i) a timer used for a second band management performed by another master unit device performing the second band management of a second slave unit included in another unit network, and (ii) a timer used for a first band management performed by the master unit device.

16. A band management method, of managing a communication time band of a first slave unit, used by a master unit device which forms a unit network in cooperation with the first slave unit, the band management method comprising:
   a management information setting step of performing a negotiation between the master unit device and another master unit device managing a second slave unit included in another unit network so as to synchronize the master unit device with the another master unit device, and of setting, in the master unit device, a time period during which a first communication occupancy right is not allocated to the first slave unit, such that the time period set in the master unit device is set in a same time period as that of the another master unit device; and
   a band management step of not allocating a second communication occupancy right in the time period during which the first communication occupancy right is not allocated to the first slave unit, as set by the management information setting step.

* * * * *